United States Patent
von der Embse

(10) Patent No.: US 7,558,310 B1
(45) Date of Patent: Jul. 7, 2009

(54) MULTI-SCALE CODE DIVISION FREQUENCY/WAVELET MULTIPLE ACCESS

(75) Inventor: Urbain Alfred von der Embse, 7323 W. 85th St., Westchester, CA (US) 90045-2444

(73) Assignee: Urbain Alfred von der Embse, Westchester, CA (US)

( * ) Notice: Subject to any disclaimer, the term of this patent is extended or adjusted under 35 U.S.C. 154(b) by 1174 days.

(21) Appl. No.: 10/806,016

(22) Filed: Mar. 23, 2004

Related U.S. Application Data

(63) Continuation-in-part of application No. 09/826,118, filed on Jan. 9, 2001, now Pat. No. 7,376,688, and a continuation-in-part of application No. 10/266,257, filed on Oct. 8, 2002, now Pat. No. 7,394,792.

(51) Int. Cl.
*H04B 1/00* (2006.01)

(52) U.S. Cl. .................. 375/130; 375/131; 375/135; 375/136; 375/146; 375/147; 375/295; 375/316

(58) Field of Classification Search ......... 375/140–151, 375/130–136, 259–260, 367, 239, 240.28, 375/242, 293, 366, 240.19, 267, 275, 295, 375/299, 316, 347, 379, 377; 382/249, 276–281
See application file for complete search history.

(56) References Cited

U.S. PATENT DOCUMENTS

| | | | |
|---|---|---|---|
| 5,159,608 A | 10/1992 | Falconer | |
| 5,761,341 A * | 6/1998 | Go | 382/232 |
| 6,064,768 A * | 5/2000 | Hajj et al. | 382/195 |
| 6,144,773 A * | 11/2000 | Kolarov et al. | 382/240 |
| 6,160,854 A | 12/2000 | Heegard | |
| 6,167,079 A | 12/2000 | Kinnunen | |
| 6,239,767 B1 | 5/2001 | Rossi | |
| 6,308,294 B1 | 10/2001 | Ghosh | |
| 6,317,413 B1 | 11/2001 | Honkasalo | |
| 6,317,466 B1 | 11/2001 | Fuschini | |
| 6,362,781 B1 | 3/2002 | Thomas | |
| 6,366,624 B1 | 4/2002 | Balachandran | |
| 6,389,138 B1 | 5/2002 | Li | |
| 6,393,012 B1 | 5/2002 | Pankaj | |
| 6,396,423 B1 | 5/2002 | Laumen | |
| 6,396,804 B2 | 5/2002 | Odenwalder | |
| 6,430,722 B1 | 8/2002 | Eroz | |
| 6,456,657 B1 * | 9/2002 | Yeap et al. | 375/240.12 |
| 6,757,343 B1 * | 6/2004 | Ortega et al. | 375/340 |
| 6,885,852 B2 | 4/2005 | Hughes | |
| 7,194,108 B2 * | 3/2007 | Tapson | 382/100 |
| 7,206,359 B2 * | 4/2007 | Kjeldsen et al. | 375/316 |
| 7,277,488 B2 * | 10/2007 | Tapson | 375/240.16 |

(Continued)

*Primary Examiner*—David C Payne
*Assistant Examiner*—Sophia Vlahos

(57) ABSTRACT

A new communications architecture combines orthogonal frequency division multiple access OFDMA and orthogonal Wavelet division multiple access OWDMA with multi-scale code division multiple access MS-CDMA. The new multi-resolution complex Wavelet application for OWDMA is a Wavelet generalization of OFDMA and forms multi-scale orthogonal channelization filter banks of individual or packet bursts of Wavelets. The new MS-CDMA spreads the users over the OFDMA/OWDMA channels over a wide frequency band and simultaneously spreads the users within each channel such that the resulting spectrum is equivalent to the current wideband CDMA spectrum and the architecture keeps the symbol rates equal to the individual channel frequency spacing for ease of synchronization and equalization to counter multipath. Variable transmit power control is supported for the different MS-CDMA groups of channels.

3 Claims, 10 Drawing Sheets

U.S. PATENT DOCUMENTS 7,295,695 B1 * 11/2007 Dayal ......................... 382/145
7,430,257 B1 * 9/2008 Shattil ........................ 375/347
7,440,505 B2 * 10/2008 Michael et al. ............. 375/259

* cited by examiner

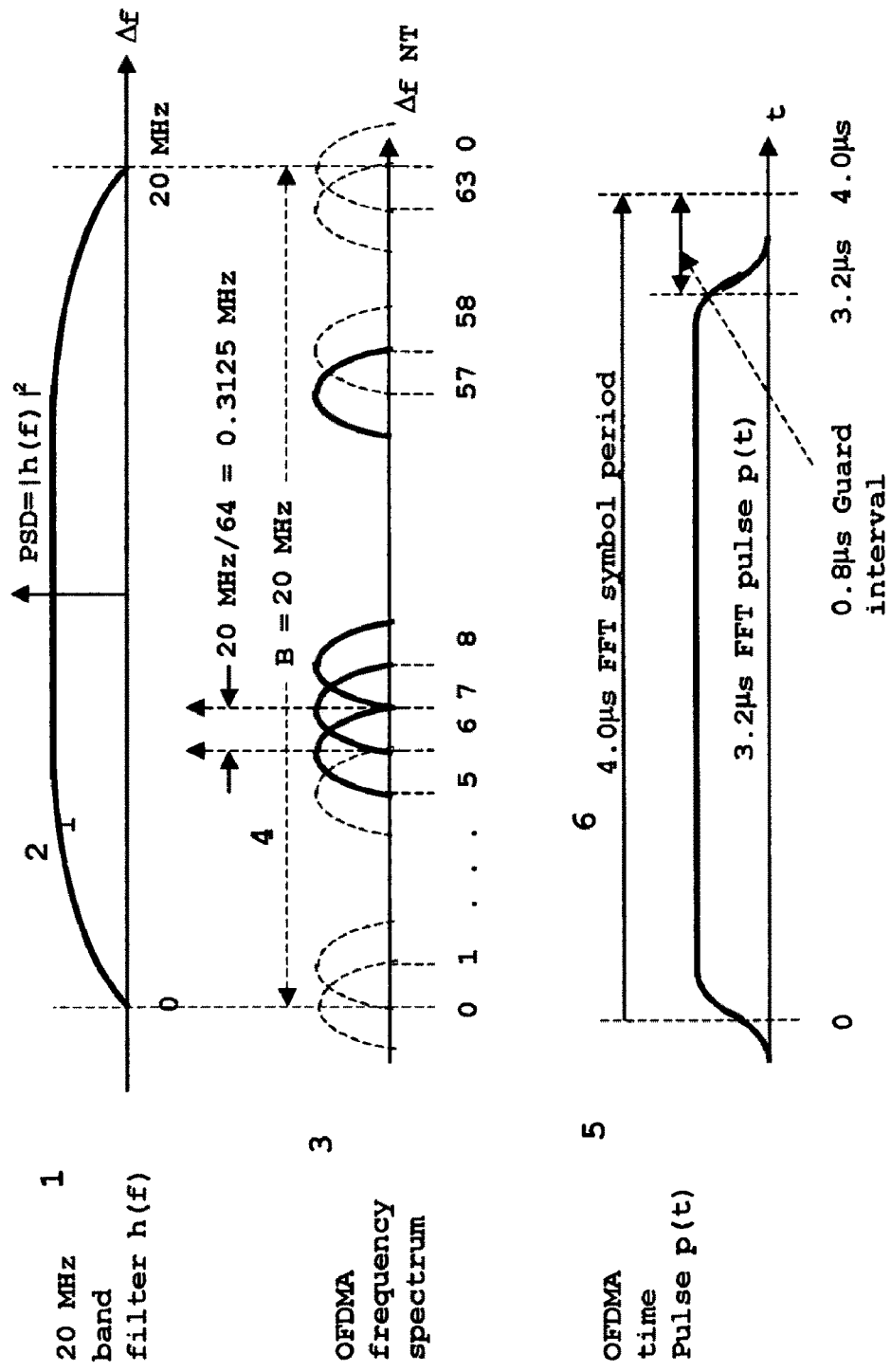
FIG. 1 Prior Art: OFDMA waveform

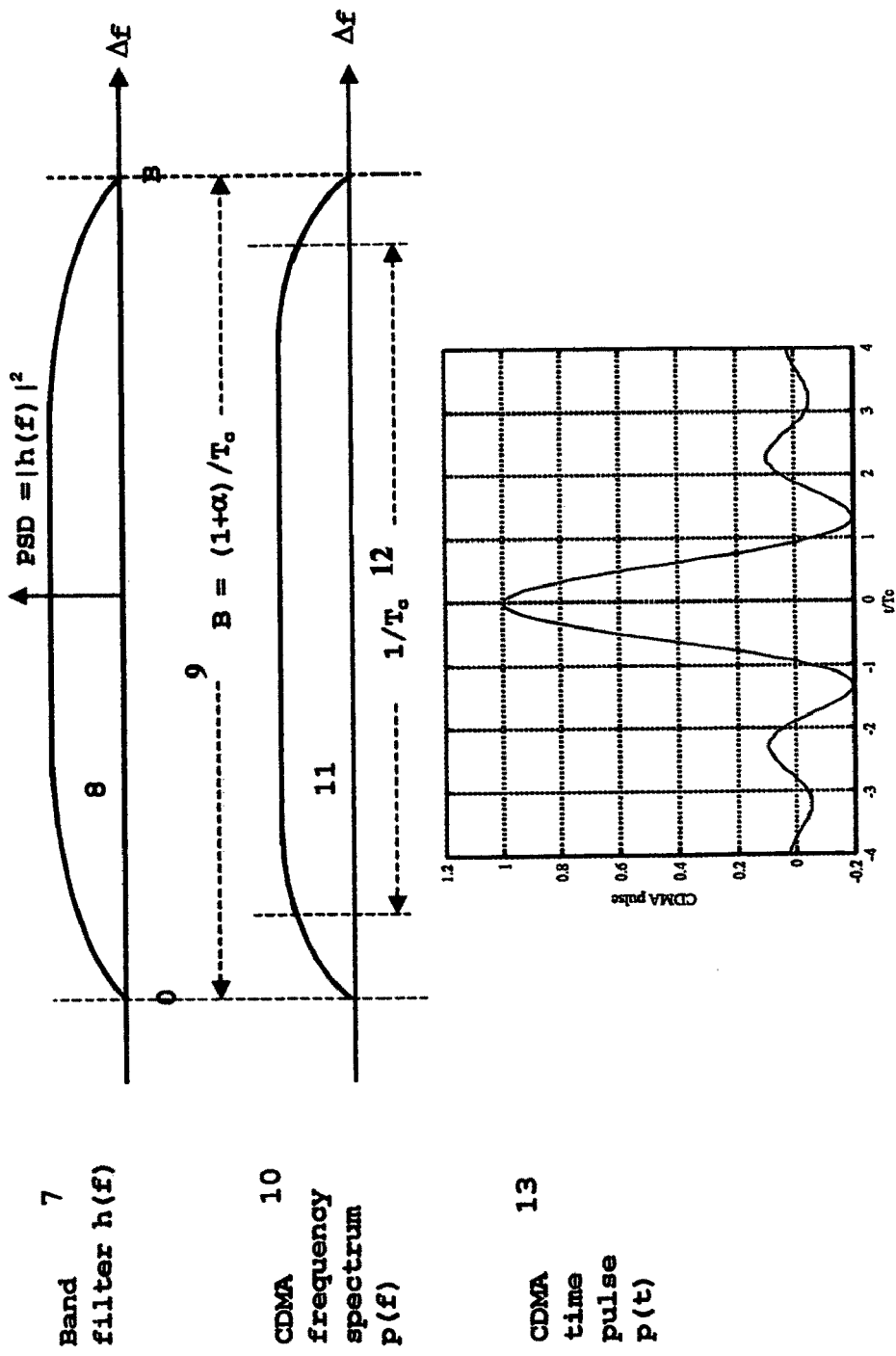
FIG. 2 Prior Art: CDMA waveform

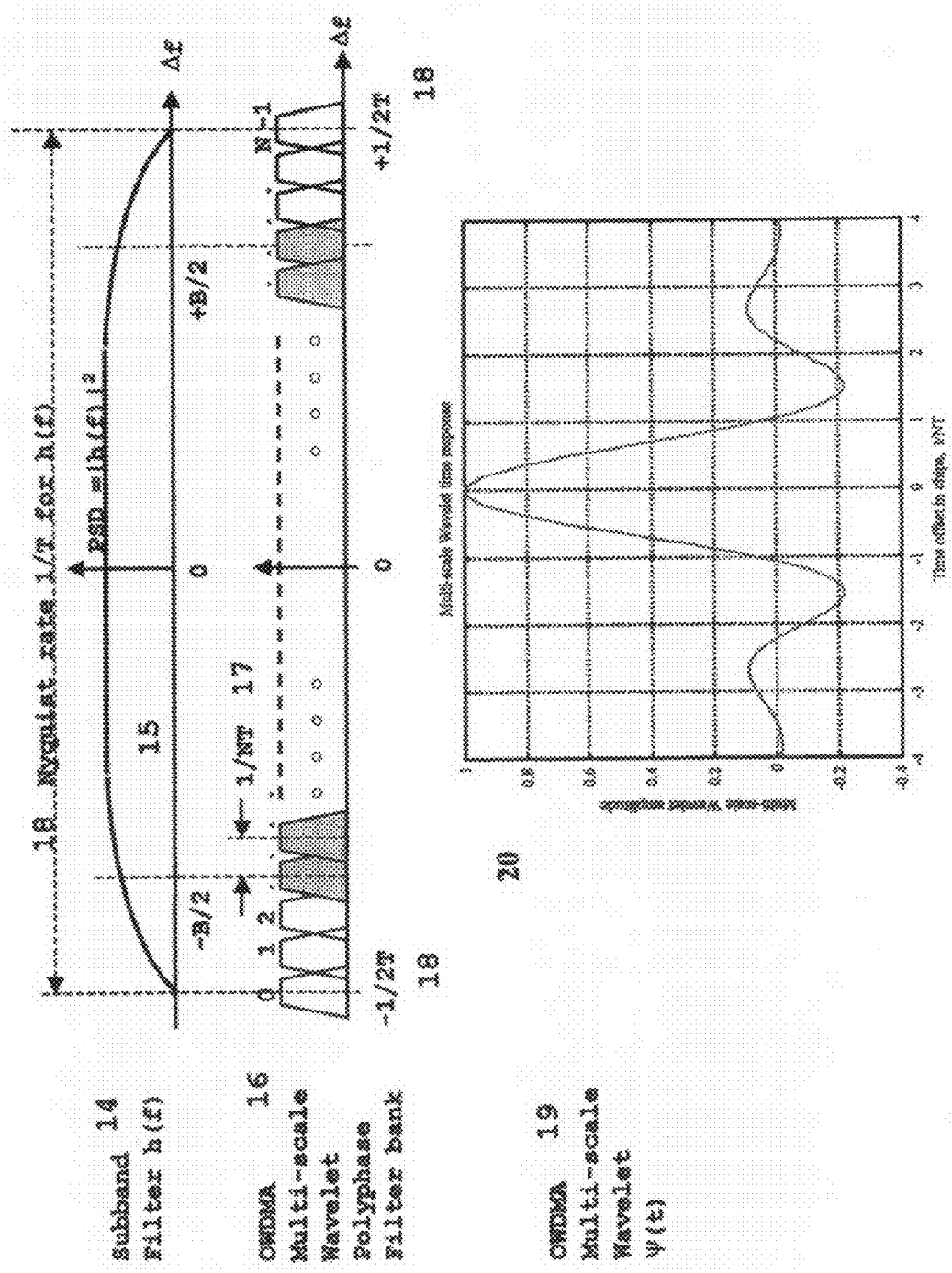
FIG. 3 OWDMA waveform

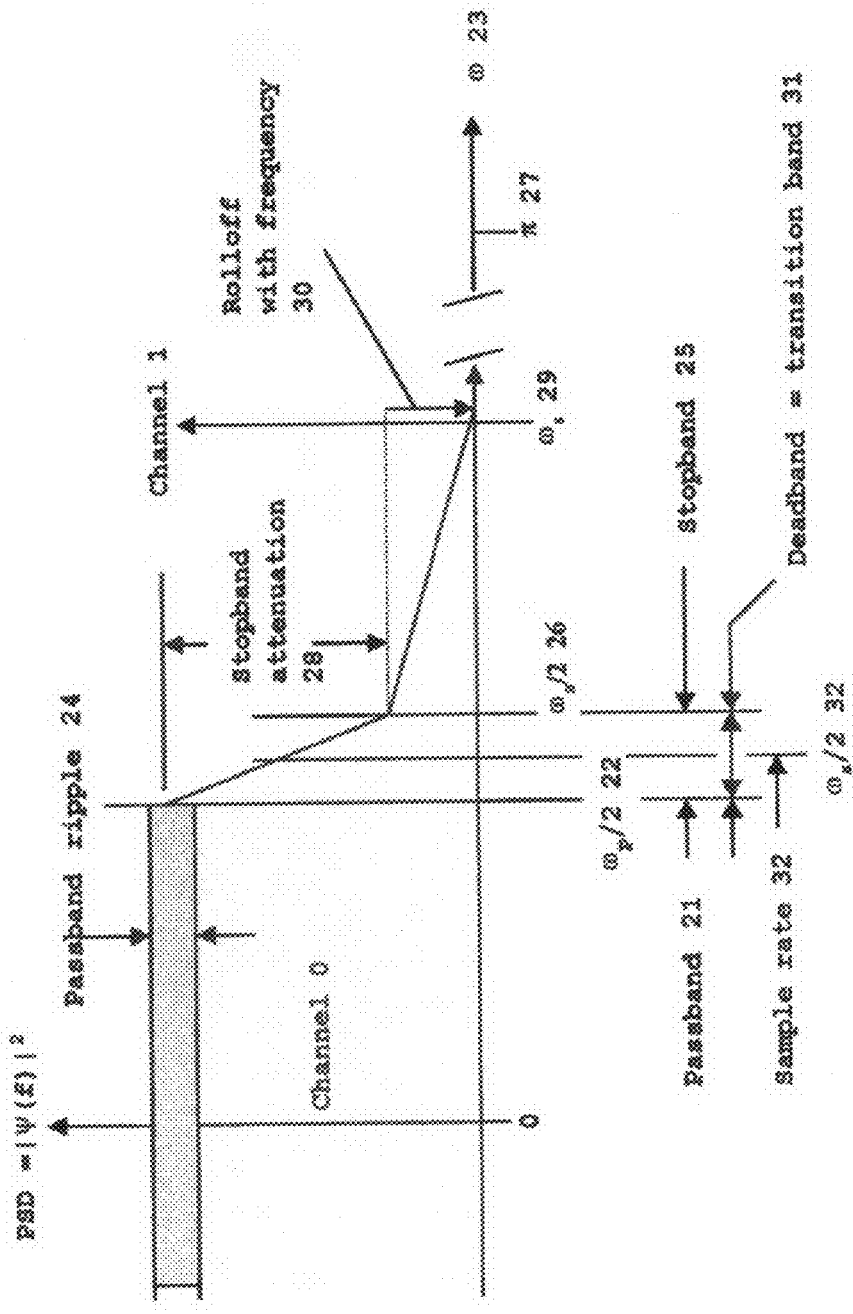
FIG. 4 Wavelet PSD=|ψ(f)|² requirements for communications

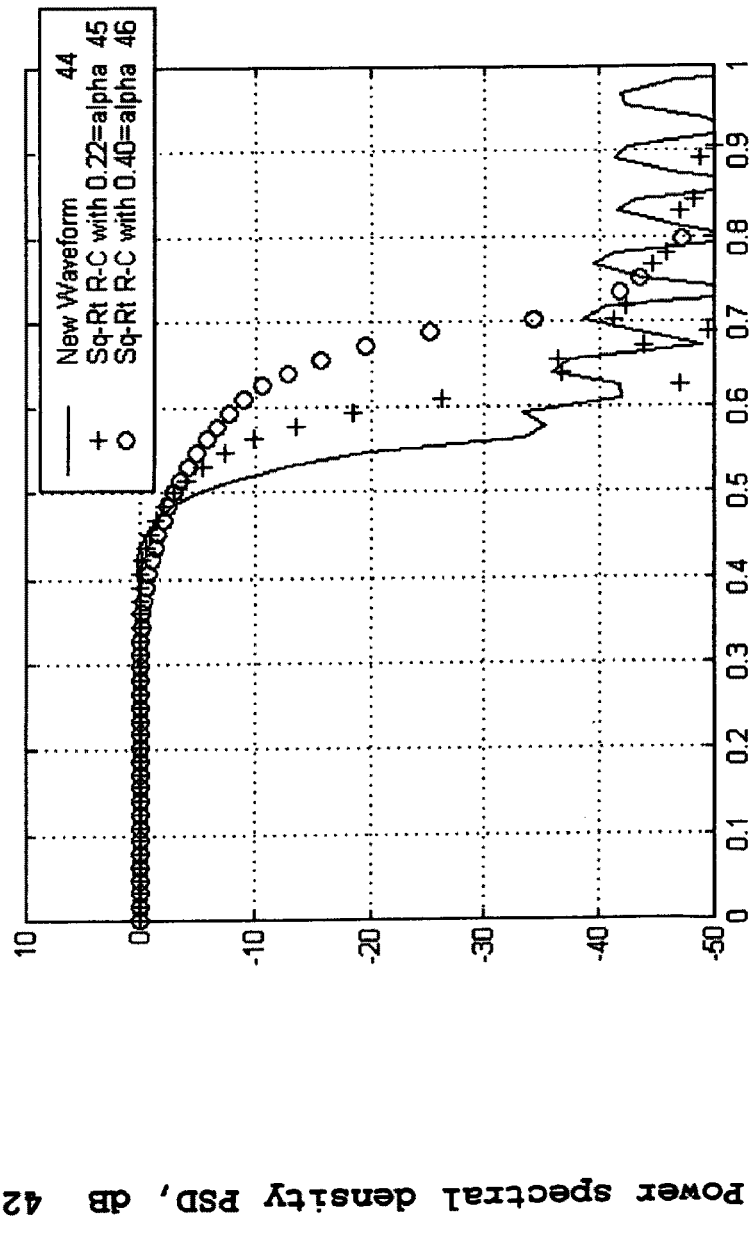
FIG. 5 PSD for New Waveform (Wavelet waveform) and Square-Root Raised Cosine (Sq-Rt R-C)

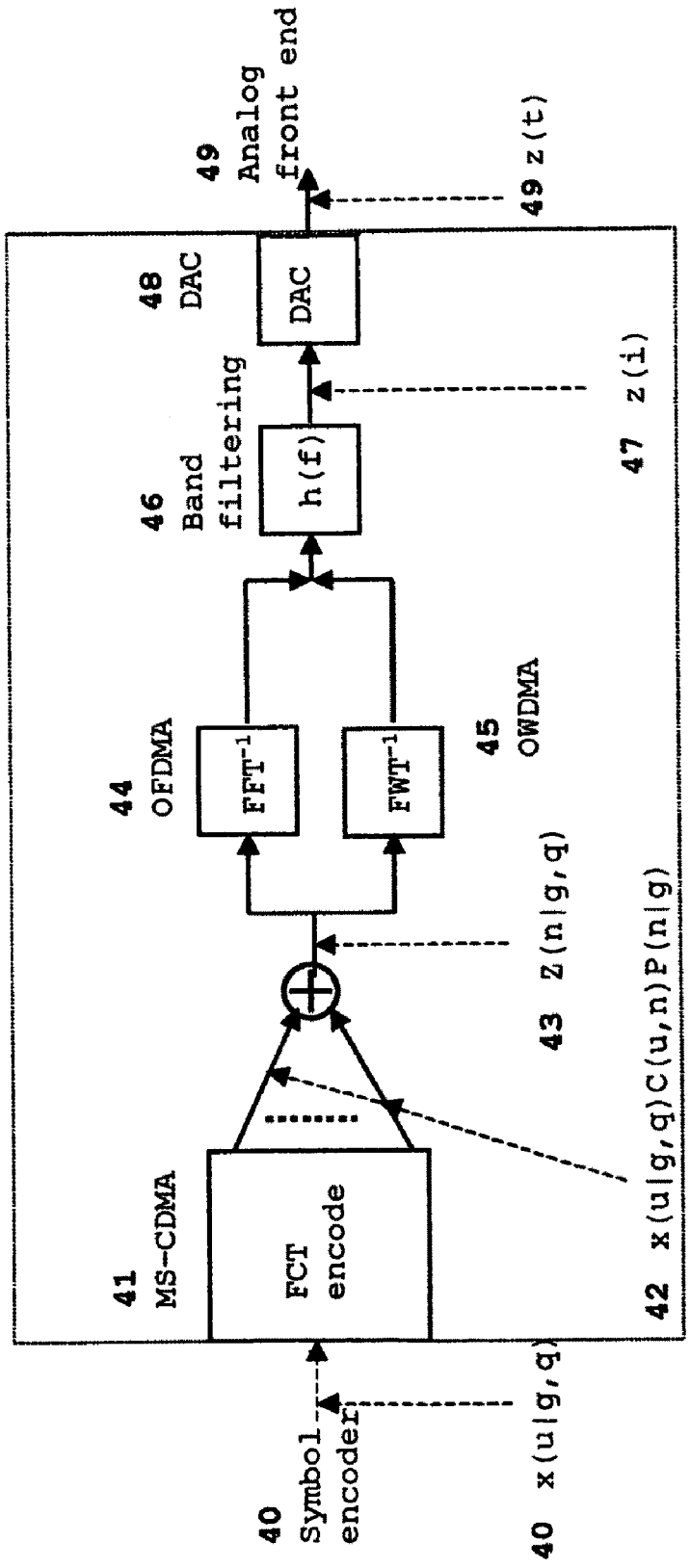
FIG. 6 MS-CDMA OFDMA/OWDMA Encoding for Transmitter

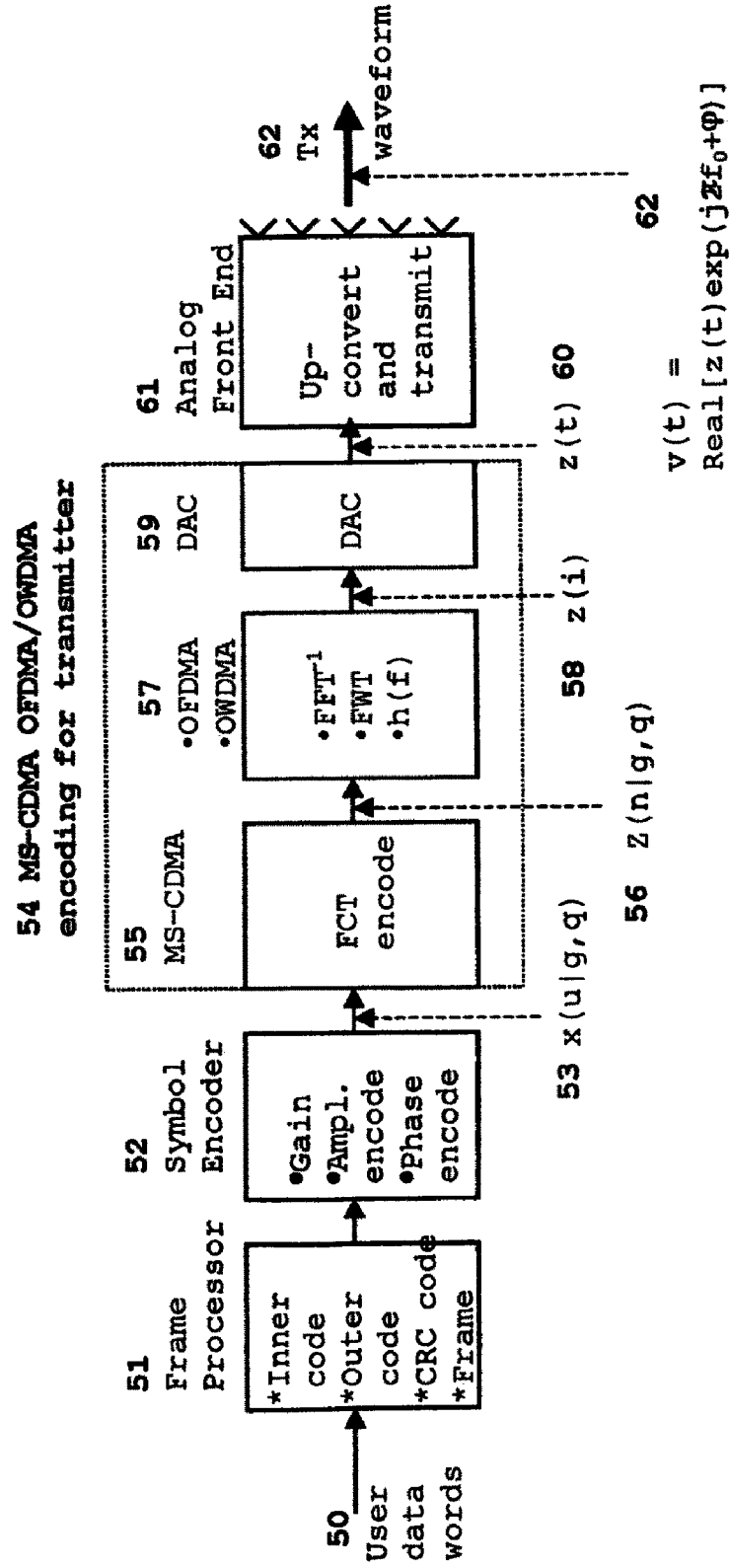
FIG. 7A    MS-CDMA OFDMA/OWDMA Transmitter:    Block Diagram

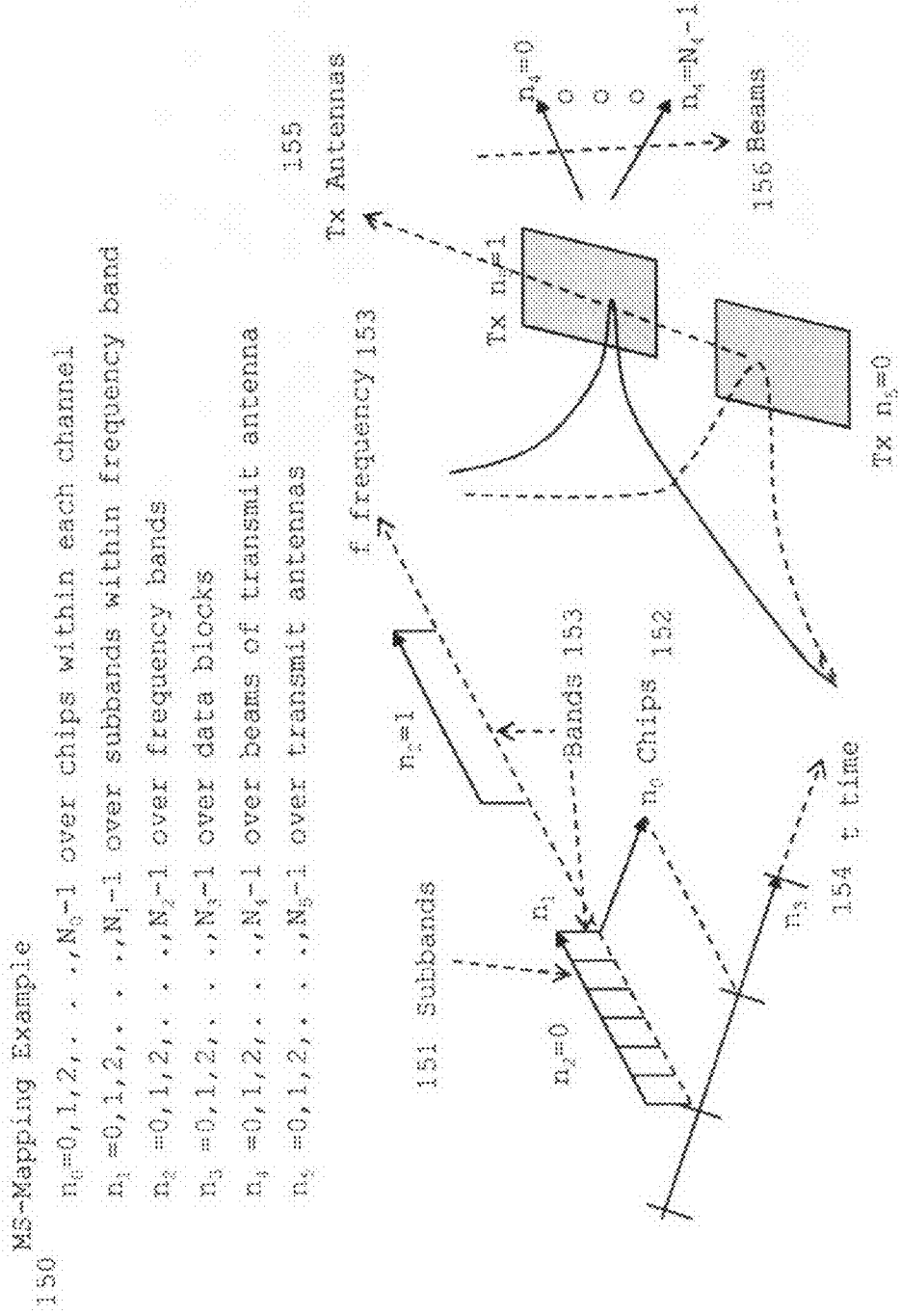

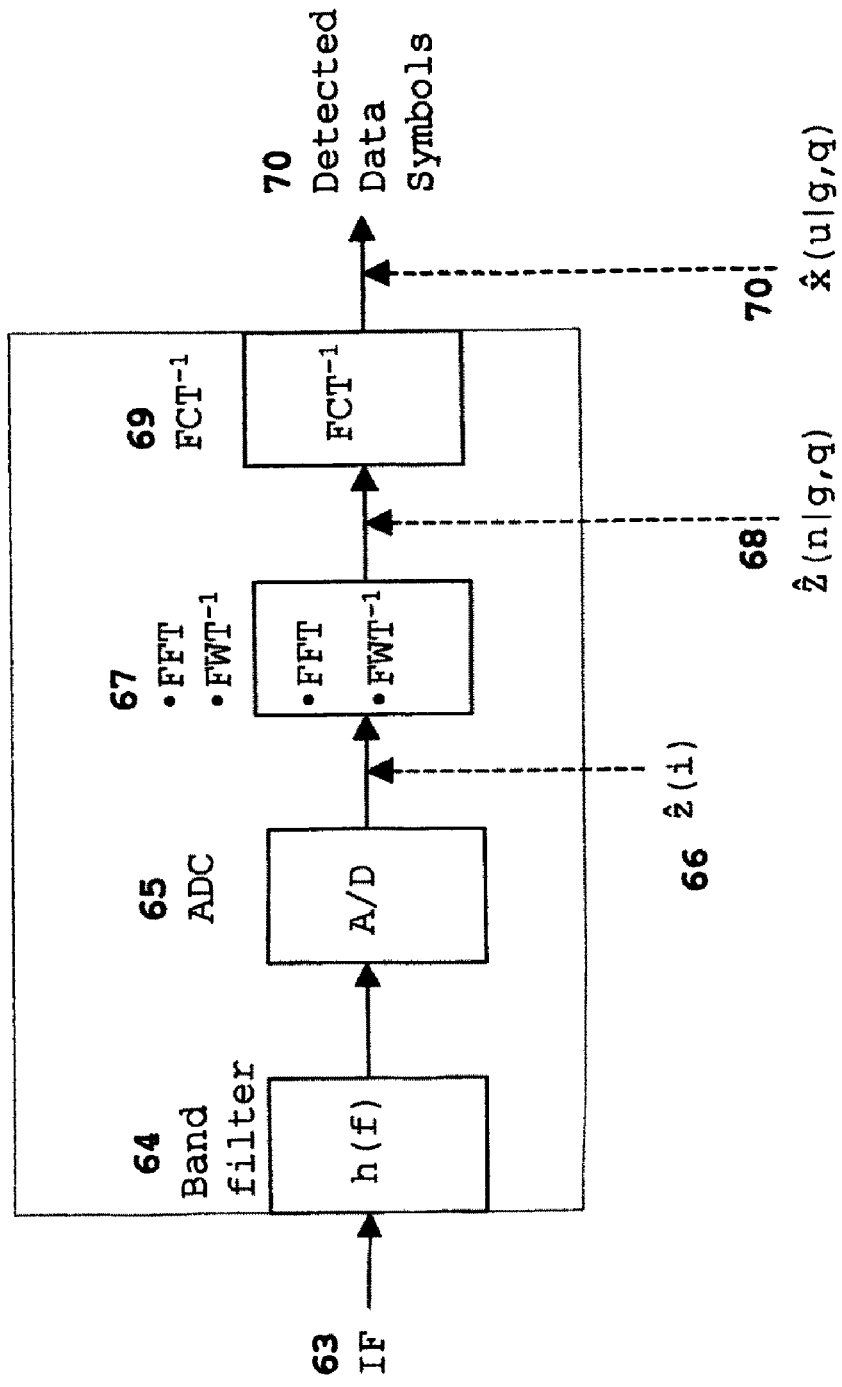
FIG. 8   MS-CDMA OFDMA/OWDMA Decoding for Receiver

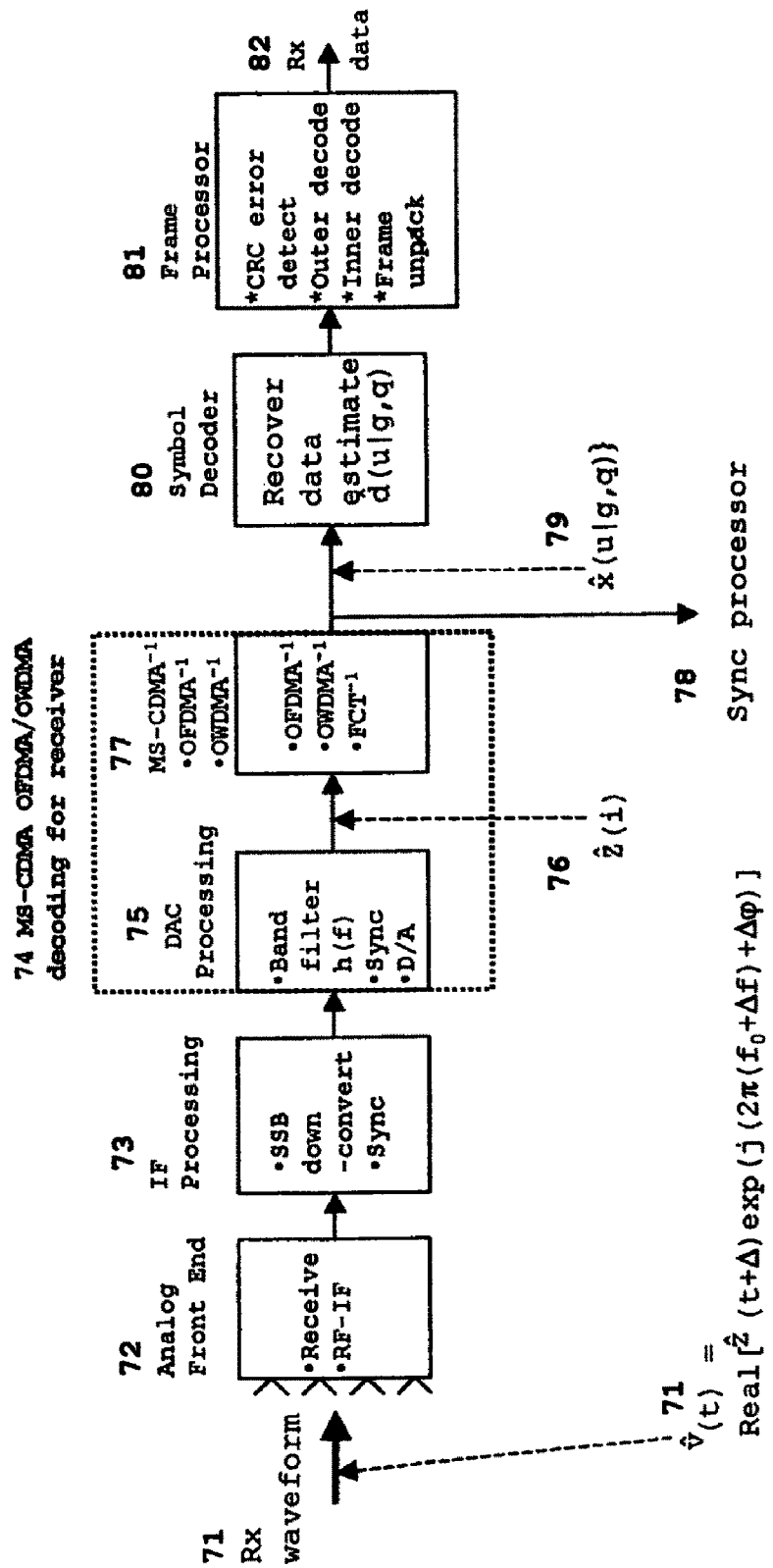
FIG. 9 MS-CDMA OFDMA/OWDMA Receiver Block Diagram

MULTI-SCALE CODE DIVISION FREQUENCY/WAVELET MULTIPLE ACCESS

This patent application is a continuation in part of application Ser. No. 09/826,118 filed on Jan. 9, 2001 now U.S. Pat. No. 7,376,688, and application Ser. No. 10/266,257 filed on Oct. 8, 2002 now U.S. Pat. No. 7,394,792.

CROSS-REFERENCE TO RELATED APPLICATIONS

U.S. Patent Documents

Listed in PTO/SB/08a attached

OTHER PUBLICATIONS

[1] IEEE 802.11g standard
[2] application Ser. No. 09/826,118 filed on Jan. 9, 2001 New multi-Resolution waveforms, U. A. von der Embse
[3] Application Ser. No. 10/266,257 filed Oct. 8, 2002 Multi-scale CDMA, U. A. von der Embse
[4] Application Sover. No. 09/826,117 filed on Jan. 9, 2001 Hybrid-Walsh codes for CDMA, U. A. von der Embse
[5] "Multirate Digital Signal Processing", R. E. Crochiere, L. R. Rabiner, 1983, Prentice-Hall
[6] "Multirate Systems and Filter Banks", R. P. Vaidyanathan, 1993, Prentice-Hall
[7] "Wavelets and Filter Banks", Gilbert Strang, Truong Nguyen, 1996, Wellesley-Cambridge Press
[8] Ronald R. Coifman, Yves Meyer, Victor Wickerhauser, "Wavelet analysis and signal processing", in "Wavelets and Their Applications", Jones & Bartlett Publishers, 1992
[9] T. Blu, "A new design algorithm for two-band orthonormal rational filter banks and orthonormal rational Wavelets", IEEE Signal Processing, June 1998, pp. 1494-1504
[10] M. Unser, P. Thevenaz, and A. Aldroubi, "Shift-orthogonal Wavelet bases", IEEE Signal Processing, July 1998, pp. 1827-1836
[11] K. C. Ho and Y. T. Chan, "Optimum discrete Wavelet scaling and its application to delay and Doppler estimation", IEEE Signal Processing, September 1998, pp. 2285-2290
[12] I. Daubechies, "Ten Lectures on Wavelets", Philadelphia: SIAM, 1992
[13] P. P. Vaidyanathan and T. Q. Nguyen, "Eigenvalues: A New Approach to Least-Squares FIR Filter Design and Applications Including Nyquist Filters", IEEE Trans. on Circuits and Systems, Vo. CAS-34, No. 1, January 1987, pp 11-23
[14] J. H. Mc.Clellan, T. W. Parks and L. R. Rabiner, "A Computer Program for Designing Optimum FIR Linear Phase Filters", IEEE Trans Audio Electroacoust. Vol. AU-21, December 1973, pp. 506-526

BACKGROUND OF THE INVENTION

I. Field of Invention

The present invention relates to both orthogonal frequency division multiple access OFDMA, to orthogonal Wavelet division multiple access OWDMA, to code division multiple access CDMA, and to multi-scale code division multiple access MS-CDMA, for cellular telephone and wireless data communications with data rates up to multiple T1 (1.544 Mbps), E1 (2.048 Mbps), Sonet, Ethernet, and higher (>10 Gbps), and to optical CDMA and optical OWDMA. Applications are to wire, wireless local area, wide area, mobile, point-to-point, and satellite communication networks. More specifically the present invention relates to a new and novel means for combining MS-CDMA with OFDMA, to a new and novel OWDMA which is an orthogonal multi-resolution complex Wavelet multiple access generalization of OFDMA, and to a new and novel means for combining MS-CDMA with OWDMA. This new architecture MS-CDMA OFDMA/OWDMA is an attractive candidate to replace current and future OFDMA applications and CDMA applications.

II. Description of Related Art

Current OFDMA art is represented by the applications to the wireless cellular communications standards IEEE 802.11a, IEEE 802.11g, IEEE 802.15.3a, IEEE 802.16. OFDMA uses the Fourier transform basis vectors as the orthogonal channelization vectors for communications with each basis vector multiplied by a symbol which is encoded with a data or pilot signal word.

The discrete Fourier transform DFT implemented as the fast Fourier transform FFT is defined in equations (1). Step 1 defines the digital sampling interval T over time, the sampling instants t=iT where i is the time index and where the sampling time 1/T is at least equal to the complex Nyquist sampling rate to prevent spectral foldover. Step 2 is the FFT of the complex baseband transmitted signal z(i) for the data block and step 3 defines the NxN orthogonal complex DFT matrix E row vectors E(k) which are the DFT harmonic vectors or basis vectors or code vectors or channelization vectors. Step 4 defines z(i) for one data block and is equal to the inverse FFT transform $FFT^{-1}$ of the user symbols x(k).

$$\text{Unweighted DFT encoding} \quad (1)$$

1 Sampling interval of DFT

|---------|------ - - ------|---------|
t ⟶ 0      T       ...    (N-2)T  (N-1)T
i ⟶ 0      1              N-1     N-1 where 1/T ≥ complex Nyquist sample rate where 1/T ≧ complex Nyquist sample rate
2 FFT of z(i)

$$X(k) = FFT[z(i)]$$
$$= \Sigma_i E(k, i) z(i)$$
$$= \Sigma_i \exp(-j2\pi ki/N) z(i)$$

3 DFT orthogonal harmonic code matrix E $$E = N{\times}N \ DFT \text{ orthogonal } DFT \text{ matrix}$$
$$= [E(k, i)] \text{ matrix of elements } E(k, i)$$
$$E(k, i) = \exp(-j2\pi ki/N) \text{ harmonic } k, \text{ time index } i$$
$$E(k) = \text{harmonic } k \text{ basis (code) vector}$$
$$= [E(k, 0), E(k, 1), \ldots, E(k, N-1)]$$
$$EE^* = NI$$
$$E(k)E^*(k') = \delta(k - k')NI$$
where $I = N{\times}N$ identify matrix
$E^* = $ complex conjugate transpose of $E$ -continued $\delta(k - k') = $ Dirac delta function $= 1$ for $k = k'$ $= 0$ otherwise 4 Transmitted DFT complex baseband signal z(i) for one data block $d(k) = $ data modulation for user $k$ $= $ encoded amplitude $A(k)$ and phase $\varphi(k)$ $x(k) = $ transmitted symbol encoded with $d(k)$ $= A(k) \exp(j\varphi(k))$ $z(i) = FFT^{-1}[x(k)]$ $= N^{-1} \Sigma_k x(k) E^*(k, i)$ OFDMA for IEEE 802.11g in reference [1] is illustrated in FIG. 1. The channelization filter h(f) 1 covers a 20 MHz frequency band 2 assigned to OFDMA. Plotted is the power spectral density PSD=|h(f)|² of this channelization filter h(f). A N=64 point fast Fourier transform FFT covers this band 2. Consistant with the IEEE specification, FIG. 1 refers to the DFT which is identical to the analog Fourier transform FT since it is the sampled data version of the FT. It is convenient to consider the DFT in this invention disclosure as the digital format for the FFT. The DFT frequency spectrum 3 consists of N=64 equally spaced filters 4 across this 20 MHz band. Filter spacing is equal to the DFT output rate 1/NT=0.3125 MHz=20 MHz/64. The DFT time pulse p(t) 5 is NT=3.2 μs in length and the total DFT period 6 is 4.0 μs which allows a 0.8 μs guard time for p(t).

Throughout this invention disclosure it will be understood that the FFT fast algorithm will always be used to implement the DFT and the inverse FFT⁻¹ fast algorithm will always be used to implement the inverse DFT⁻¹.

OFDMA transmitter encoding of the OFDMA waveform in FIG. 1 is defined in equations (2). Step 1 lists the parameters and definitions and step 2 defines the time domain weighting. Step 3 is the complex baseband transmitted signal z(i).

OFDMA encoding for transmitter  (2)

1 Parameters and definitions from 1 in equation (1) and $h(i) = 20$ Mhz band filter impulse response $p(i) = $ impulse response of the $DFT$ waveform $= $ real weighting function in 6 in FIG. 1

$N = 64$ point $DFT$ $1/T = 20$ MHz sample rate for $DFT$ $\geq$ complex Nyquist rate $NT = 3.2 \mu s$ $DFT$ length $1/NT = 0.3125$ MHz $DFT$ output rate $= DFT$ channel separation $= DFT$ tone spacings 52 channels are used: 4 pilot, 48 data 12 guard band channels for rolloff of the h(k)

2 Pulse p and band filter h weighting for DFT basis vectors $\underline{p} = p\copyright h$, convolution of $p$ and $h$ $= $ filter transfer function in time domain for the combined $h$ and $p$ filters $[\underline{p}(0), \underline{p}(1), \ldots, \underline{p}(N-1)]$ 3 Transmitted OFDMA encoded baseband signal z(i) for one data block $d(k) = $ data modulation for user $k$ $= $ encoded amplitude $A(k)$ and phase $\varphi(k)$ $x(k) = $ transmitted symbol encoded with $d(k)$ $= A(k) \exp(j\varphi(k))$ $z(i) = FFT^{-1}[\underline{p}(i) x(k)]$ $= N^{-1} \Sigma_k \underline{p}(i) x(k) E^*(k, i)$ OFDMA for IEEE 802.11g has the strict orthogonality of the DFT(FFT) replaced by cross-correlations between the 48 channel tones and other impacts due to the band channelization and pulse weighting p©h plus the time errors Δt and frequency errors Δf from synchronization errors, multi-path, propagation, and terminal stresses. These impacts on orthogonality are low enough to allow OFDMA to support higher values for the symbol signal-to-noise ratio S/N in the detection band that are required for higher order symbol modulations. The highest order symbol modulation currently is 64 state quadrature amplitude modulation 64-QAM corresponding to 6 bits per symbol where 6=log₂(64) and log₂(o) is the logarithm to the base 2. With rate 3/4 convolutional coding the highest information rate is 4.5 bits/symbol=6×3/4. Required S/N at a BER=1.0e−6 is approximately S/N~19 dB.

OFDMA for IEEE 802.11g provides 48 channels over a 20 MHz frequency band at a symbol rate equal to 0.25 MHz=1/4.0 μs from 6 in FIG. 1 and for a maximum information rate equal to 4.5 bits/symbol this equals a burst rate of 54 MBps=4.5×48×0.25. Some spread spectrum properties are realized by hopping the 20 MHz band, shuffling the channel assignments over the 48 available channels for a user assigned to several channels in order to spread his transmissions over the band, and for "flash" ODFMA by a random hopping of each user channel across the 48 available channels within the band.

OFDMA receiver decoding of the OFDMA waveform in FIG. 1 is defined in equations (3) for the receiver and derives estimates of the transmitted symbols by implementing matched filter detection in the receiver.

OFDMA decoding for receiver  (3)

OFDMA decoding for one data block derives estimates $\hat{x}(k)$ of $x(k)$ from the receiver estimates $\hat{z}(i)$ of $z(i)$ -continued $$\hat{x}(k) = FFT[\hat{z}(i) \circledcirc \underline{p}]$$
$$= \Sigma_i \hat{z}(i) \circledcirc \underline{p} E(k, i)$$
$$\cong x(k)$$

Current CDMA spread spectrum art is illustrated by the waveform in FIG. 2 which describes the waveform for full band CDMA communications over the band B 9 which is the output range a of the band filter h(f) 7. The CDMA chip rate $1/T_c$ 12 is less than the available frequency band B to allow the chip frequency spectrum p(f) 10,11 to roll off. As defined 9 in FIG. 2 the band B and chip rate are related by equation $B=(1+\alpha)/T_c$ where $\alpha$ is the bandwidth expansion factor close to $\alpha=0.25$ for high performance communications. Frequency spectrum p(f) 10 for the CDMA communications is essentially equal to the representative time pulse p(t) is a square-root raised cosine pulse which can be used for high performance communications to obtain a reasonably flat spectrum with a sharp rolloff at the edges to enable the chip rate $1/T_c$ to be reasonably close to the available frequency band B.

Chip rate $1/T_c$ is the CDMA total symbol rate. The users could be at different data rates but this and other architectural variations do not limit the scope of this invention. Power is uniformly spread over the CDMA pulse waveform spectrum p(f).

It is self evident to anyone skilled in the CDMA communications art that these communications mode assumptions are both reasonable and representative of the current CDMA art and do not limit the applicability of this invention.

CDMA encoding of the waveform in FIG. 2 for the transmitter is defined in equations (4). Steps 1,2 define the CDMA transmission and parameters. Step 3 defines the user symbol x(u). Step 4 is the set of Walsh orthogonal channelization codes w(u) and step 5 is the pseudo-random PN covering or spreading code. Step 6 defines the complex baseband signal z(t) as the waveform $\underline{p}(t-nT_c)$ multiplied by the encoded sum over u and n.

CDMA encoding for transmitter (4)

1 CDMA transmission

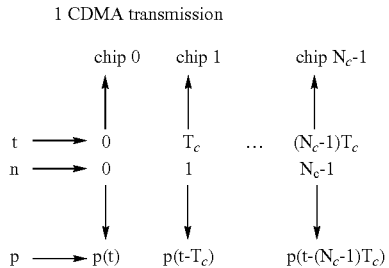

where $$\underline{p}(t-nT_c) = p(t-nT_c) \circledcirc h(t)$$
$$= \text{convolution of } p(t-nT_c) \text{ and } h$$
$$= \text{filter transfer function in time domain}$$
$$\text{for the combined } p(t-nT_c) \text{ and } h \text{ filters}$$

2 Parameters and definitions
$N_c$=Number of users and orthogonal code chips
$T_c$=CDMA chip length or repetition interval
$1/N_c T_c$=User symbol rate 3 User complex signal x(i)

$$d(u) = \text{data modulation for user } u$$
$$= \text{encoded amplitude } A(u) \text{ and phase } \varphi(u)$$
$$x(u) = \text{transmitted symbol encoded with } d(u)$$
$$= A(u) \exp(j\varphi(u))$$

4 Walsh orthogonal channelization code matrix W $$W = \text{Code matrix, } N_c \text{ rows of } N_c \text{ code vectors}$$
$$= [W(k, n)] \text{ matrix of elements } C(k, n)$$
$$W(u, n) = +/-1, \text{ chip } n \text{ of vector } u$$
$$W(u) = \text{code vector } u, \text{ row } k \text{ of } W$$
$$= [W(u, 0), W(u, 1), \ldots, W(u, N_c - 1)]$$

5 PN covering (spreading) code P(n) for chip n $$P(n)=\exp(j\phi(n))$$

6 Transmitted CDMA complex baseband signal z(t)

$$z(t)=N_c^{-1}\Sigma_u\Sigma_n P(n)W(u,n) \times (u)\underline{p}(t-nT_c)$$

CDMA decoding of the waveform in FIG. 2 for the transmitter is defined in equations (5). Step 1 defines the convolution R(n,n-n') of the CDMA pulse waveform with itself in the matched filter receiver. Steps 2,3 are the Walsh and PN decoding properties. Step 4 uses the matched filter detection theorem to derive the estimates of the transmitted symbols.

CDMA decoding for receiver (5)

1 Parameters and definitions are defined in 1,2,3 in equations (4) together with $R(n,n-n')$=convolution of $\underline{p}(t-nT_c)$ with $\underline{p}(t - n'T_c)$ evaluated at the receiver detection times $t = nT_c$ $$= R(n)\delta(n - n')$$
$$= R(n) \text{ for } n = n'$$
$$= 0 \text{ otherwise}$$

2 Walsh decoding of channelization codes W(k)

$WW^*=N_c I$ where $I=N_c \times N_c$ identify matrix
$W^*$=conjugate transpose of W $<W(k),W(k')>=N\delta(k-k')$ 3 PN decoding $P(n)P^*(n)=1$ for all $n$ where $P^*$=complex conjugate of P 4 CDMA decoding $$\hat{x}(k)=\Sigma_n P^*(n)W^*(k,n)\,\hat{z}(t)\circledcirc\underline{p}(t-nT_c)$$

It should be obvious to anyone skilled in the communications art that these example implementation algorithms in equations (1), (2), (3), (4), (5) clearly define the fundamental OFDMA and CDMA signal processing relevant to this invention disclosure and it is obvious that this example is representative of the other possible signal processing approaches.

For cellular applications the encoding algorithms for the transmitter describe the implementation of OFDMA and of CDMA encoding and are the transmission signal processing applicable to this invention for both the hub and user terminals, and the decoding algorithms for the receiver describes the corresponding OFDMA and CDMA receiving signal processing for the hub and user terminals for applicability to this invention.

For optical communications applications the microwave processing at the front end of both the transmitter and the receiver is replaced by the optical processing which performs the complex modulation for the optical laser transmission in the transmitter and which performs the optical laser receiving function of the microwave processing to recover the complex baseband received signal with the remainder of the signal processing functionally the same for the OFDMA and for the CDMA encoding transmitter and functionally the same as described for the OFDMA and CDMA receiving signal processing receiver.

BRIEF SUMMARY OF THE INVENTION

This invention introduces the new OWDMA communications technology which implements orthogonal multi-resolution complex Wavelet division multiple access and is a multi-resolution complex Wavelet generalization of OFDMA; introduces the new application of the multi-scale code division multiple access MS-CDMA architecture which integrates MS-CDMA with OFDMA and with OWDMA, and introduces the variable gain control over frequency.

The new OWDMA forms a uniform set of contiguous orthogonal filters across the available frequency band in one of the numerous available architectural options and which implements a polyphase filter bank across the available frequency band with the basic property that the filters are orthogonal. Each filter defines a OWDMA channel for communications. Similar to OFDMA, the symbol rate within each channel is equal to the channel separation 1/NT where N is the number of channels, 1/T is the frequency band, and NT is the symbol-to-symbol separation and which is made possible by using multi-resolution complex Wavelet channelization filters developed in reference [2]. OWDMA filters are orthogonal in frequency which means their frequency spectrums are non-overlapping, and they have flat spectrums across each channel.

OWDMA orthogonality only requires frequency synchronization whereas OFDMA orthogonality requires both time and frequency synchronization which means that time synchronization errors on the user communication channels for the return links to the hub or access point for cellular communications do not degrade the orthogonal separation between the channels as they will for OFDMA.

Sensitivity to frequency synchronization errors is less for OWDMA primarily because of the non-overlapping of the frequency spectrums. The overall tolerance to user-to-user imbalances on the return communications channels is better for OWDMA primarily because their design keeps the frequency spectrums from overlapping in the presence of real operational conditions with synchronization errors. This allows the forward communications link to support a power imbalance between channels to mitigate differing ranges and path losses at the user antennas.

Application of multi-scale code division multiple access MS-CDMA in reference [2] provides a means to implement the new hybrid-Walsh orthogonal CDMA codes in reference [4] over the OFDMA/OWDMA channels by spreading the CDMA within each channel and over all of the channels such that each user can be spread over the complete band. This keeps the chip rate equal to 1/NT while maintaining the spreading over the fullband 1/T and allows the band transmit Tx power to be independently controlled in frequency. These two CDMA scales 1/NT, 1/T are generated by MS-CDMA in combination with the OFDMA/OWDMA channelization filter banks. The 1/T scale is to combat fading and interference similar to the current CDMA, and the 1/NT scale is for acquisition, synchronization, and equalization protection against multi-path and provides the flexibility for band power control to provide a frequency diversity communications improvement.

Variable control over the frequency B can be implemented by partitioning the CDMA over the channels into separate groups and assigning an independent power level to each group of channels. OWDMA readily supports differences in power levels between adjacent channels. Power control is desirable to support differences in quality of service SoC, range losses, and path loss.

It should be obvious to one familiar with the CDMA communications art that the number of scales could be a larger number than the two used in this invention disclosure and the multi-resolution complex Wavelet design for OWDMA supports the partitioning of the frequency band 1/T into several frequency scales for the channelization filters, supports individual multi-resolution complex Wavelet packets for communications in the time-frequency domain and which can be integrated into the MS-CDMA, and supports separate and segmented communications bands simultaneously.

BRIEF DESCRIPTION OF SEVERAL VIEWS OF THE DRAWINGS

The above-mentioned and other features, objects, design algorithms, and performance advantages of the present invention will become more apparent from the detailed description set forth below when taken in conjunction with the drawings and performance data wherein like reference characters and numerals denote like elements, and in which:

FIG. 1 is a description of the OFDMA waveform in the frequency and time domains over a 20 MHz band for the IEEE 802.11g standard.

FIG. 2 is a description of the CDMA waveform in the frequency and time domains over a band B.

FIG. 3 is a description of the OWDMA waveform in the frequency and time domains over a band B.

FIG. 4 is a description of the design requirements on the multi-resolution complex Wavelet PSD=$|\psi(f)|^2$.

FIG. 5 is a representative baseband frequency response for the multi-resolution complex Wavelet filter and the square-root cosine filters for the bandwidth expansion factors=0.22, 0.40.

FIG. 6 is a representative implementation of MS-CDMA OFDMA/OWDMA encoding for transmitter.

FIG. 7A is a representative MS-CDMA OFDMA/OWDMA transmitter implementation block diagram. the.

FIG. 7B is a representative MS-CDMA OFDMA/OWDMA transmitter MS-CDMA mapping.

FIG. 8 is a representative implementation of MS-CDMA OFDMA/OWDMA encoding for the receiver.

FIG. 9 is a representative implementation block diagram for the MS-CDMA OFDMA/OWDMA receiver.

DETAILED DESCRIPTION OF THE INVENTION

This invention introduces the new orthogonal multi-resolution complex Wavelet division multiple access OWDMA communications technology which is a multi-resolution complex Wavelet generalization of OFDMA, introduces the new multi-scale code division multiple access MS-CDMA architecture to integrate MS-CDMA with OFDMA, and introduces the new MS-CDMA architecture to integrate MS-CDMA with OFDMA, OWDMA uses the multi-resolution complex Wavelet waveform developed in reference [2] to generate multi-rate orthogonal filter banks and waveforms to support communications at the critical symbol rate equal to a combined 1/T symbols per second for a 1/T Hz frequency band. The critical symbol rate is the Nyquist sample rate and corresponds to no excess bandwidth $\alpha=0$ in the equation $B=(1+\alpha)/T$ which can be rewritten as the bandwidth-time product $BT=(1+\alpha)$ that relates filter bandwidth B and the symbol rate 1/T for communications supported by this filter. For the OFDMA filter in FIG. 1 it is observed $BT=1+\alpha=64/52=1.33$ corresponding to $\alpha=0.33$ since 52 of the 64 DFT filters generated are used and for the CDMA filter in FIG. 2 it is observed that the bandwidth-time product is about $BT=1.25$ corresponding to $\alpha=0.25$ for the 3G CDMA cellular communications systems.

Multi-resolution complex Wavelet design algorithms were developed in reference [2] as a means to design polyphase multirate filters, quadrature mirror filters (QMF), perfect reconstruction filters, Wavelet iterated filter banks, and Wavelet tiling of the time-frequency t-f space. Prior to the invention of multi-resolution complex Wavelet design algorithms, theoretical studies had not yielded useful realizable filters for system applications implementing these architectures as summarized by the digital filtering and polyphase research in references [5], [6] and the Wavelet research as summarized in the references [7], [8],[9], [10], [11].

Multi-resolution complex Wavelets defined in equations (6), (7), (8) expand the Wavelet analytical formulation to include a frequency variable which specifies the center frequency of our new Wavelets and performs a frequency translation of the real mother Wavelet to this center frequency. Currently, Wavelets are real functions of the scale and translation parameters. Multi-resolution complex Wavelets are functions of these parameters plus the frequency variable. This new concept of frequency as an additional parameter provides an added degree of flexibility and together with the Fourier domain design approach provide an entirely new means for deriving these new waveforms as generalization of the traditional real Wavelets and their modification to include the added frequency parameter. With frequency translation as the additional parameters the analytical formulation of these new waveforms as a function of the baseband or mother waveform centered at dc(dc refers to the origin f=0 of the frequency space) is given in equations (6).

Equations (6) introduce the new multi-resolution complex Wavelets. Step 1 in equations (6) is the definition for the continuous real Wavelet over the time-frequency t-f space from reference [7], [9], [12] where $\psi(t)$ is the Wavelet which is a waveform of finite extent in time t and frequency f over the t-f space. Wavelet parameters a,b are the Wavelet dilation and translation respectively or equivalently are the scale and shift. The $\psi(t)$ without the indices a,b is the mother Wavelet which is a real and symmetric localized function in the t-f space used to generate the doubly indexed Wavelet $\psi(t|a,b)$ where $\psi(t|a,$ b) reads the $\psi$ is a function of time t for the parameters a,b. Scale factor $|\alpha|^{-1/2}$ has been chosen to keep the norm of the Wavelet invariant under the parameter change a,b. Norm is the square root of the energy of the Wavelet response. The Wavelets $\psi(t|a,b)$ and $\psi(t)$ are localized functions in the t-f space which means that both their time and frequency lengths are bounded.

Step 2 in equations (6) defines the digital Wavelet which is a Wavelet over the digital t-f space corresponding to digitization of the t-f space at the 1/T analog-to-digital A/D rate where T is the interval between digital samples and "i" is the index over the digital samples. Time "t" for the continuous Wavelet in 1 is replaced by the equivalent digital sample number "i" corresponding to t=iT at sample i. Wavelets in digital t-f space have an orthogonal basis that is obtained by restricting the choice of the parameters a,b to the values $\alpha=2^{-P}$, $b=qN2^{P}$ where p,q are the new scale and translation parameters and N is New multi-resolution complex Wavelets (6)

1 Current continuous Wavelet as a function of the mother Wavelet at dc $\omega(t|a,b)=|a|^{-1/2}\psi((t-b)/a)$ where a,b are the dilation, shift parameters 2 Current digital real Wavelet
Digital Wavelet shift q and scale p $a=2^P$ $b=qN2^P$ Digital Wavelet as a function of mother Wavelet $\psi(i|p,q)=2^{-p/2}\psi(2^{-p}i-qN)$ where N=number of samples over the Wavelet spacing or repetition interval
$T_s$=NT wavelet spacing
i=digital sampling index
T=digital sampling interval
t=iT time index at digital sample i 3 new digital multi-resolution complex Wavelet is a function of the mother Wavelet at dc 3.a) Generalized complex format $\psi(i|p,q,k)=2^{-p/2}\psi(2^{-p}i-qN)\exp[j2\pi f_c(p,k)2^{-p}iT]$ 3.b) Multi-rate filter complex format $\omega(i|p,q,k)=2^{-p/2}\omega(2^{-p}i-qN)E^*(k2^p,2^{-p}i)$ 4 Orthogonality equations for our new digital complex Wavelet $\Sigma_i \psi(i \mid p, q, k)\psi^*(i \mid p', q', k') = N$ iff $p = p', q = q', k = k'$ $= 0$ otherwise 5 New digital complex Wavelet for a uniform filter bank as a function of the mother Wavelet at dc $\psi(i|p=0,q,k)=\psi(i-qN)E^*(k,i)$ the spacing or repetition interval $T_s$=NT of the Wavelets (which from a communications viewpoint are symbols) at the same scale p. Wavelets at p,q are related to the mother Wavelet by the equation in 2 where the mother Wavelet is a real and even function of the sample coordinates and which follows directly from 1 for the continuous t-f space.

Steps 3,4 in equations (6) define our new Wavelet in the digital t-f space and their orthogonality properties. Our new Wavelets are complex generalizations of Wavelets in t-f space which enable them to be useful for communications and radar applications. This generalization is accomplished 1) by the addition of a frequency translation parameter k which controls the frequency offset of the Wavelet, 2) by generalizing the Wavelet weighted orthonormality properties in step 4 to apply to waveforms over the time translation q and over the scales p with the inclusion of the frequency translation and where ψ* is the complex conjugate of ψ and is required in the orthogonality equations since the multi-resolution complex Wavelet ψ becomes complex with the addition of harmonic k, and 3) by their characterization and design in the Fourier domain. The frequency parameter k controls the frequency translation $\exp[j2\pi f_c(p,k)2^{-p}iT]$ in 3 for the generalized format and the frequency translation $E^*(k2^p,2^{-p}i)$ in 3 for the multi-rate filter format. With this frequency translation the analytical formulation 3 of these new Wavelets is given as a function of the baseband or mother waveform centered at dc corresponding to k=0. Purpose of the frequency index k is to identify the center frequencies of the waveforms at the scale p and time translation q in the t-f space. The generalized center frequency $f_c(p,k)$ of the frequency translated dc waveform at scale p and frequency index reduces to $f_c(p,k)=k2^p/NT$ for application to multi-rate filters.

Step 5 in equations (6) defines the equations for our new Wavelet for a uniform polyphase filter bank which is one of several OWDMA candidate architectures. Our new Wavelets in 5 are the impulse responses of the corresponding digital symbols encoded with digital data for transmission which is the synthesis filter bank in polyphase theory, and are the filter bank detection impulse responses for recovery of the transmitted digital symbols by the analysis filter bank in polyphase theory assuming matched filter detection. The digital filters are observed to be the DFT's of the mother wavelets similar to the construction of the OWDMA in 3 in equations (2) upon replacing the OWDMA pulse waveform p with the mother Wavelet ψ(i−qN) in 5 and setting q=0 corresponding to the symbol at t=0.

Equations (7) derive the multi-resolution complex Wavelet as a function of the Fourier design coordinates. Design algorithms provide a means to design the mother Wavelet in the Fourier frequency domain to fit the communications and radar specifications. From this mother Wavelet, the Wavelets at the appropriate scales {p,q,k} are easily found as demonstrated in 3,5 in equations (6). Design in the frequency domain means the design coordinates specifying the Wavelet are Fourier frequency harmonics or coordinates. Step 1 lists the parameters and coordinates and step 2 defines the Fourier harmonic frequency design coordinate.

Step 3 is the DFT representation from equations 3 in equations (1) of the real mother Wavelet ψ(i) as a function of the DFT Fourier harmonic coefficients {ψ(k')}. Step 4 derives the equation for the multi-resolution complex Wavelet as a function of the DFT Fourier harmonic coefficients by substituting 3 in equations (7) into 3 in equations (6).

Digital multi-resolution complex Wavelet is a function of the Fourier harmonic design coordinates  (7)

1 Parameters and coordinates $\psi = \psi(i)$  mother Wavelet $= \psi(i \mid p=0, q=0, k=0)$ -continued $N'$ = length of the mother Wavelet $\psi(i)$ $= NL + 1$ $N$ = sampling interval of $\psi$ $=$ spacing of $\psi$ for orthogonality $L$ = length of $\psi$ in units of $N$ $T$ = spacing of digital samples $T_s = N'T$ length of $\psi$ in seconds 2 Fourier harmonic frequency design coordinates $\psi(k')$ = value of the Fourier design harmonic $k'/N'T$ $=$ Fourier harmonic design coordinate value $\{k'\}$ = set of harmonic design coordinates for $k' = 0, +/-1, \ldots$ corresponding to harmonics $\{k'/N'T\}$ 3 Multi-resolution real mother Wavelet definition $\psi(i) = \Sigma_{k'} \psi(k') E^*(k',i)$ 4 Multi-resolution complex Wavelet definition $\psi(i \mid p, q, k) = 2^{-p/2} \Sigma_k, \psi(k') E * (k'/L + k2^p, 2^{-p}(i-qN))$ Several fundamental properties follow directly from the frequency design approach in 4 in equations (7). It is demonstrated in reference [2] that our multi-resolution complex Wavelets are implemented with our design in the Fourier domain and our multi-resolution complex Wavelet design remains invariant under scale changes. It is demonstrated in reference [2] that the Fourier frequency domain design in 3 in equations (7) remains invariant for all parameter changes and in particular for all scale changes.

Multi-resolution complex Wavelet design algorithms are illustrated by a representative least-squares LS design for a OWDMA polyphase uniform filter bank in FIG. 3. There are two categories of LS algorithms and these are the eigenvalue and the gradient search that respectively can be reduced to algorithms equivalent to the original eigenvalue [13] and Remez-exchange [14] waveform design algorithms for application to a uniform filter bank.

FIG. 3 is an example of an orthogonal multi-resolution complex Wavelet division multiple access OWDMA Wavelet polyphase filter bank over the band B by setting N in 5 in equations (6) equal to the N in 17 in FIG. 3. The band channelization filter is a roofing filter h(f) 14 that covers the B frequency band 15 assigned to OWDMA. Unlike its use in FIG. 1 for the OWDMA with B=20 MHz this filter is intended to be flat over the frequency band B of interest and with a bandwidth 18 equal to 1/T>B. Plotted is the power spectral density PSD=|h(f)|² of this channelization filter h(f). The h(f) output is digitized at the sample rate 1/T to form the OWDMA multi-resolution complex Wavelet polyphase filter bank 16 which are uniformly spaced 17 at 1/NT Hz over the 1/T frequency band 1/T. This digital sample rate 1/T is sufficiently large to allow the use OWDMA filters in 17 in FIG. 3 for communications over the band B 18 with no excess bandwidth α=0 unlike the OFDMA in FIG. 1 which has α=0.33 and CDMA in FIG. 2 with α=0.25.

This OWDMA polyphase filter bank is ideally decimated which means the filter output multi-resolution complex Wavelet sample rate $1/T_s$ is equal to the channel-to-channel spacing $1/T_s=1/NT$ equivalent to stating that there is no excess bandwidth α=0 within the filter bank. A representative 19 OWDMA multi-resolution complex Wavelet ψ for L=8 is plotted in 20 as a function of the time offset expressed in units of the multi-resolution complex Wavelet spacing NT. This ψ was designed by the eigenvalue category of LS design algorithms. Our design for this topology is immediately applicable to an arbitrary set of multi-resolution OWDMA filters through the scaling 3,4 in equations (7) which gives the design of our Wavelet at arbitrary scales in terms of our design of the mother Wavelet.

Multi-scale mother Wavelet ψ design for the OWDMA polyphase filter bank in FIG. 3 starts by using the frequency design template in FIG. 4 to construct the LS error metrics as a function of the DFT frequency design coordinates {ψ(k')} in 2 in equations (7) which define the mother Wavelet in 3 in equations (7). Next minimization search algorithms are developed and used to find the values of {ψ(k')} that minimize the weighted sum of these LS design error metrics equal to the cost function J in equations (8) for the LS design. Minimizing J with respect to the {ψ(k')} gives the design values of {ψ(k')} for constructing the mother Wavelet in 3 in equations (7).

Equations (8) define the LS cost function J constructed with the LS metrics with the aid of the frequency design template in FIG. 4. Step 1 defines the LS error metrics which are the passband error metric μ(1), stopband error metric μ(2), quadrature mirror filter QMF error metric μ(3), intersymbol interference error metric μ(4), and the adjacent channel interference error metric μ(5).

LS cost function J for designing ψ(i)  (8)

1 LS metrics

μ(1)=passband LS error metric measures the LS error of the passband ripple 24 in FIG. 4

μ(2)=stopband LS error metric measures the stopband attenuation 28 in FIG. 4

μ(3)=quadrature mirror filter QMF LS error metric measures the flatness of the sum of two contiguous filters over the deadband 31 in FIG. 4

μ(4)=orthogonality LS error metric measures the intersymbol interference ISI between overlapping Wavelets of different symbol μ(5)=orthogonality LS error metric measures the adjacent channel interference ACI from nearest neighbor channels 2 Metric Weighting w(n)=metric weight for error metrics n=1,2,3,4,5 in 1
≧0 such that $\Sigma_n w(n)=1$

3 Cost function J $J=\Sigma_n w(n)\mu(n)$

FIG. 4 is the frequency design template for the power spectral density PSD=|ψ(f)|² of the multi-resolution complex Wavelet and defines the parameters of interest for the passband metric μ(1) and stopband metric μ(1) in step 1 in equations (8). Passband 21 of the wavelet PSD=|ψ(f)|² is centered at dc (f=0) since we are designing the mother Wavelet, and extends over the frequency range $\omega_p$ extending from $-\omega_p/2$ to $\omega_p/2$ 22 in units of the radian frequency variable ω=2πfT 23 where T is the digital sampling interval defined in FIG. 3. The frequency space extends over the range of Δf=−1/2T to Δf=+1/2T which is the frequency range in FIG. 3 and the mother Wavelet is at the center of the frequency band. Quality of the PSD=|ψ(f)|² over the passband is expressed by the passband ripple 24. Stopband 25 starts at the edge 26 of the passbands of the adjacent channels $+/-\omega_d/2$ 26 and extends to the edge of the frequency band o=+/−π 27 respectively. Stopband attenuation 28 at $+/-\omega_d/2$ measures the PSD=|ψ(f)|² isolation between the edge of the passband for the mother Wavelet and the start of the passband for the adjacent Wavelet channel centered at $+/-\omega_s$ 29. Rolloff 30 of the stopband is required to mitigate the spillover of the Wavelet channels other than the adjacent Wavelet channels, onto the mother Wavelet channel. Deadband or transition band 31 is the interval between the passbands of contiguous Wavelet channels, and is illustrated in FIG. 4 by the interval from $\omega_p/2$ to $\omega_d/2$ between the mother Wavelet channel and the adjacent Wavelet channel at $\omega_a$. Waveform sample rate $\omega_s$ 32 is the waveform repetition rate. For the LS example algorithm, the waveform sample rate is equal to the channel-to-channel spacing for zero excess bandwidth. Therefore, $1/T_s=\omega_s/2\pi T=1/NT$ which can be solved to give $\omega_s=2\pi/M$ for the radian frequency sampling rate of the filter bank which is identical to the Wavelet repetition rate.

Equations (8) step 1 QMF LS error metric μ(3) expresses the requirement on the deadband that the PSD's from the contiguous channels in FIG. 4 add to unity across the deadband 31 [$\omega_p, \omega_s$] in FIG. 4 in order that the Wavelets be QMF filters.

Equations (8) step 1 Inter-symbol interference ISI and ACI error metrics μ(4), μ(5) are orthonormality metrics that measure how close we are able to design the set of Wavelets to be orthonormal over the t-f space, with the closeness given by the ISI error metric μ(4) and the ACI error metric μ(5). ISI is the non-orthogonality error between Wavelets within the same channel separated by multiples of the sampling interval 1/MT seconds where T is the sample time and M is the interval of contiguous samples. Adjacent channel interference ACI is the non-orthogonality error between Wavelets within a channel and the Wavelets in adjacent Wavelet channels at the same sample time and at sample times separated by multiples of the sample interval. As observed as noise contributions within each sample in a given channel, the ISI is the noise contribution due to the other received Wavelets at the different timing offsets corresponding to multiples of the sampling interval. Likewise, the ACI is the noise contribution due to the other Wavelets in adjacent Wavelet channels at the same sampling time and at multiples of the sampling interval.

Equations (8) step 1 ISI and ACI errors are fundamentally caused by different mechanisms and therefore have separate metrics and weights to specify their relative importance to the overall sum of the LS metrics. ISI is a measure of the non-orthogonality between the stream of Wavelets within a channel as per the construction in FIG. 4. On the other hand, ACI is a measure of the non-orthogonality between the Wavelets within a channel and the other Wavelets in adjacent channels. This means the stopband performance metric has a significant impact on the ACI due to the sharp rolloff in frequency of the adjacent channel, and the ACI metric is then a measure of the residual non-orthogonality due to the inability of the stopband rolloff in frequency from completely eliminating the ACI errors.

Equations (8) step 2 defines the weights of the LS error metrics when summed to yield the cost function J. These weights are real and normalized to sum to unity. They have proven to be helpful in the Wavelet design to emphasize the relative importance of the individual error metric contributions to J.

Equations (8) step 3 defines the cost function J as the weighted sum of the LS error metrics and which is minimized with respect to the DFT frequency design harmonics $\{\psi(k')\}$ to select the best LS choice for the $\{\psi(k')\}$ to design the mother Wavelet in 3 in equations (7) and the channel Wavelets by frequency translation in 5 in equations (6).

Multi-scale mother Wavelet frequency response in FIG. 5 is evaluated by implementing the LS design algorithms in reference [2] that minimize the J in 3 in equations (8) to find the best set of DFT frequency design coordinates $\{\psi(k')\}$ which give the mother Wavelet 3 in equations (7). FIG. 5 plots the PSD frequency response for the multi-scale mother Wavelet and the square-root (sq-rt) raised-cosine (r-c) waveforms with excess bandwidth $\alpha=0.22, 0.40$ which waveforms are extensively used for other communications. Plotted are the measured PSD in dB 42 versus the frequency offset 43 from dc expressed in units of the symbol rate. for the new Wavelet waveform 44, the sq-rt r-c with $\alpha=0.22$ 45, and the sq-rt r-c with $\alpha=0.40$ 46. It is believed that the multi-resolution complex Wavelets can be designed as a filter with better performance parameters than possible with any other known algorithm.

OWDMA encoding for the transmitter is defined in equations (9). Step 1 lists parameters and definitions and step 2 defines the transmitted OWDMA encoded baseband signal z(i) for contiguous data blocks and where the symbol offsets A account for symbol overlaps over the symbol q data block interval within each channel.

OWDMA encoding for transmitter (9)

1 Parameters and definitions $h(i)$ = roofing filter impulse response in time for $h(f)$ in 15 in FIG. 3

$\psi(i) = \psi(i \mid p = 0, q = 0, k = 0)$ mother Wavelet in 3 in equations (7)

= baseband or dc $k = 0$ Wavelet at $p = 0, q = 0$ $N$ = number of OWDMA filters over the $1/T$ frequency band $1/T$ = digital sample rate for OWDMA $\geq$ complex Nyquist rate for roofing filter $h(f)$ $NT$ = OWDMA Wavelet spacing $1/NT$ = OWDMA Wavelet output rate = OWDMA Wavelet channel separation $NBT$ = channels used for data and pilot where $B$ is the frequency band in FIG. 3

$N(1 - BT)$ = guard band channels for rolloff of the $h(f)$ $d(k, q)$ = data modulation for user $k$ for data block $q$ = encoded amplitude $A(k \mid q)$ and phase $\varphi(k \mid q)$ $x(k \mid q)$ = transmitted symbol encoded with $d(k)$ -continued $= A(k \mid q) \exp(j\varphi(k \mid q))$ Assume the $h(f)$ is flat over the passband for both Tx and Rx and can be neglected 2 Transmitted OWDMA encoded baseband signal z(i)
Time index field referenced to q=0

$i = 0, +/-1, +/-2, \ldots$

= digital sampling time index $i_0$ = index over a $\psi(i)$ spacing interval $= 0, 1, 2, \ldots, N - 1$ $\Delta$ = index over the $\psi(i)$ range in units of the $\psi(i)$ spacing interval $N$ $= (L/2 - 1), \ldots, -1, 0 + 1, \ldots, +(L/2 - 1)$ Complex baseband signal $z(i_0 \mid q)$ = complex baseband signal over $i_0$ for data block $q$ $= FWT[x(k \mid q + \Delta)]$ $= N^{-1} \Sigma_\Delta \Sigma_k x(k \mid q + \Delta)\psi(i \mid q + \Delta, k)$ $= N^{-1} \Sigma_\Delta \Sigma_k x(k \mid q + \Delta)\psi(i_0 + \Delta N)E*(k, i_0)$ $z(i) = \Sigma_q z(i_0 \mid q)$ where FWT is the fast multi-resolution complex Wavelet transform 3 FWT algorithm for OWDMA encoding in the transmitter
3.a) FWT ire-calculation $FFT^{-1}$ $\lambda(i_0, q + \Delta) = N^{-1} \Sigma_k x(k \mid q + \Delta)E*(k, i_0)$ $= FFT^{-1}[N^{-1} \Sigma_k x(k \mid q + \Delta)E*(k, i_0)]$ 3.b) FWT post-sum $z(i_0 \mid q) = \Sigma_\Delta \psi(i_0 + \Delta N)\lambda(i_0 \mid q + \Delta)$ 4 Computational complexity of fast algorithm
Real multiply rate $R_M$ $R_M T = 2 \log_2(N) + 2L$ Real add rate $R_a$ $R_A T = 3 \log_2(N) + 2L$ Step 3 is the new fast FWT algorithm in this invention disclosure for the transmitted OWDMA which consists of the pre-calculation $FFT^{-1}$ in sub-step 3.a followed by a post-sum in sub-step 3.b.

Step 4 evaluates the real multiply complexity metric $R_M T$ and real add computational complexity metrics $R_A T$ in terms of multiplies/adds per digital sample for the fast algorithm in step 3. The first term in these metrics is the complexity of the $FFT^{-1}$ for a base 2 and the second term is the complexity of extending the multi-resolution complex Wavelet waveform over L of the symbol intervals.

OWDMA decoding for the receiver is defined in equations (10). Step 1 refers to 1,2 in equations (9) for the parameters and definitions and defines the OWDMA filtering Wavelet. Step 2 demonstrates Wavelet orthogonality. Estimates of the transmitted symbols in step 3 are equal to the $FWT^{-1}$ of the received baseband signal.

OWDMA decoding for receiver (10)

1 Parameters and definitions are defined in 1,2 in equations (9) together with
OWDMA filtering wavelet from 5 in equations (6)

$$\psi*(i|q,k) = \psi*(i|p=0,q,k)$$
$$= \psi(i-qN)E(k,i_0)$$

Assume the h(f) is flat over the passband for both Tx and Rx and can be neglected 2 Multi-resolution complex Wavelet orthogonality from 4 in equations (6)
k,k' orthogonality $$\Sigma_i \psi(i|q,k)\,\psi^*(i|q,k') = \Sigma_i \psi^2(i-qN)E^*(k,i)E(k',i)$$
$$= \Sigma_{i_0}\Sigma_\Delta[\Sigma_{\Delta q}\psi^2(i_0+\Delta)N)]E*(k,i_0)E(k',i_0)$$
$$\cong \Sigma_{i_0}[1]E*(k,i_0)E(k',i_0)$$
$$= N\delta(k-k')$$

using the completeness property of the multi-resolution complex Wavelet from reference [2]

$$[\Sigma_\Delta \psi^2(i_0+\Delta)N)] \cong 1 \text{ for all } i_0$$

q,k and q',k' orthogonality proven in reference [2] and restated in 4 in equations (6)

3 OWDMA decoding derives estimates $\hat{x}(k|q)$ of $x(k|q)$ for data block q from the receiver estimates $\hat{Z}(i)$ of $z(i)$ $$\hat{x}(k|q) = FWT^{-1}[\hat{z}(i)]$$
$$= \Sigma_i \hat{z}(i)\psi^*(i|q,k)$$

4 FWT algorithm for OWDMA decoding in receiver
4.a) FWT pre-sum $$\lambda(i_0|q) = \Sigma_\Delta \hat{z}(i_0+q+\Delta)\psi(i_0+\Delta N)$$
$$= \Sigma_\Delta \hat{z}(i_0+\Delta N|q)\psi(i_0+\Delta N)$$

4.b) FWT pre-sum FFT $$\hat{x}(k|q) = \Sigma_{i_0}\lambda(i_0|q)E(k,i_0)$$

5 Computational complexity of fast algorithm
Real multiply rate $R_m$ $$R_m T = 2\log_2(N) + 2L$$

Real add rate $R_a$ $$R_A T = 3\log_2(N) + 2L$$

Step 4 is the new fast algorithm for the received OWDMA which partitions the baseband symbol detection $\hat{x}(k|q)$ in step 3 into a pre-sum calculation sub-step 4.a of $\lambda(i_0|q)$ followed by a sub-step 4.b FFT of this pre-sum.

Step 5 evaluates the real multiply complexity metric $R_M T$ and real add computational complexity metrics $R_A T$ in terms of multiplies/adds per digital sample for the fast algorithm in step 3. The first term in these metrics is the complexity of the $FFT^{-1}$ for a base 2 and the second term is the complexity of extending the multi-resolution complex Wavelet waveform over L of the symbol intervals.

MS-CDMA parameters and codes are defined in equations (11). Step 1 defines the scenario parameters. Step 2 partitions the user index u field into the sub-fields $u_0,u_1$ of size $N_0,N_1$ for scales 0,1 respectively and which are the indices over the users within each channel and the indices over the channels within the MS-CDMA group and which uniquely represent u as $u=u_0+u_1 N_1$.

Step 3 partitions the code chip index n field into the sub-fields $n_0,n_1$ of size $N_0,N_1$ for scales 0,1 respectively and which are the indices over the chips within each channel and the indices over the channels of the MS-CDMA group and which uniquely represent n as $n=n_0+n_1 N_1$.

Step 4 defines the $N_c \times N_c$ MS-CDMA code matrix C whose elements are C(u,n) where u+1 is the row index and n+1 is the column index and where the +1 has been added to correspond to the row and column numbering starting with +1. MS-CDMA code vector MS-CDMA parameters and codes (11)

1 Scenario parameters $M$ = number of communications channels of band $B$ $N_0$ = number of CDMA chips per channel $N_1$ = number of channels in MS-CDMA group $N_c$ = number of chips in MS-CDMA group = $N_0 N_1$ $1/T_0$ = MS-CDMA chip/symbol rate
 = $1/NT$ for OFDMA, OWDMA in FIG. 1, 2

$x(u,q)$ = User $u$ in group $q$
 = $x(k|q)$ when $N_0 = 1, u = k$
 = $x(k)$ when $N_0 = 1, u = k, q = 0$ 2 User index u for a MS-CDMA group $u$ = Index of CDMA users
 = $0, 1, \ldots, (N_c - 1)$
 = $(u_0, u_1)$ field representation of $u$
 = $u_0 + u_1 N_0$ for fields $u_0, u_1$ where the index fields are $u_0$ = index of users in a channel in the MS-CDMA group
 = $0, 1, \ldots, (N_0 - 1)$ $u_1$ = index of channels in the MS-CDMA group
 = $0, 1, \ldots, N_1 - 1$ 3 Code chip index n for a MS-CDMA group $n$ = Index of CDMA code chips $= 0, 1, \ldots, (N_c - 1)$ $= (n_0, n_1)$ field representation of $n$ $= n_0 + n_1 N_0$ for fields $n_0, n_1$ where the index fields are $n_0$ = index of code chips within a channel in the MS-CDMA group $= 0, 1, \ldots, (N_0 - 1)$ $n_1$ = index of channels in the MS-CDMA group $0, 1, \ldots, (N_1 - 1)$ 4 MS-CDMA code matrix C for a MS-CDMA group $C = N_c \times N_c$ MS-CDMA code matrix $= [C(u, n)]$ matrix of elements $\{C(u, n)\}$ $= [c(u)]$ matrix of $1 \times N_c$ code vectors $C(u) =$ MS-CDMA code vector $u$ which is row $u + 1$ in $C$ counting rows, columns starting with 1

$= [C(u, 0), C(u, 1), \ldots, C(u, N_c - 1)]$ 5.b the C is constructed as is a Kronecker or Tensor product $C = C_1 \otimes C_0$ of $C_1$ and $C_0$ where "$\otimes$" is the Kronecker or tensor product and the matrix $C_1$ is the $N_1 \times N_1$ MS-CDMA scale "1" code matrix over the user channels within the MS-CDMA group and the matrix $C_0$ is the $N_0 \times N_0$ MS-CDMA scale "0" code matrix for the user chips within each channel in the MS-CDMA group.

MS-CDMA representative application to OFDMA in FIG. 1 uses the candidate architecture which spreads the CDMA over the M contiguous 48 data channels or 52 contiguous data plus pilot channels and the representative application to OWDMA in FIG. 3 uses the candidate architecture which spreads the CDMA over the M contiguous OFDMA communications channels across B.

MS-CDMA partitions the M channels into channel groups of size $N_1$ and provides a scale over the chips within the channels and another scale over the channels within this group. Code chip length $N_1$ for each user in a channel group is equal to $N_c = N_0 N_1$ where $N_0$ is the number of chips in each channel assigned to scale "0" and $N_1$ is the number of channels assigned to scale "1" within the group. Each user has a chip scale "0" and a channel scale "1". Chip scale "0" spreads the data over the chips within each channel and channel scale "1" then spreads the channel chips uniformly over the $N_1$ channels with the result that each user occupies each of the channels within the $N_1$ channel group.

There could be from 1 to $M/N_1$ channel groups depending on the architecture and applications. The use of multiples groups $M/N_1 > 1$ tends to be desirable since the storage requirements and computational complexity are reduced as the number of groups are increased and the spreading advantages within each group tend to saturate as the number $N_1 > 16$ when the channels within each group are spread across the fullband M channels.

For $N_0 = 1$ there is no CDMA within each channel and the MS-CDMA then spreads the signals over each channel within a group for both OFDMA and OWDMA to function as a means to spread each channel over the fullband M channels and which may be a desirable architecture when the channels are sufficiently narrow to produce a sufficiently long pulse to counter multipath.

MS-CDMA OFDMA transmitter equations are defined in equations (12) for MS-CDMA. Step 1 gives the parameters and definitions. Step 2 defines the encoding equations for chip no for data block q. Sub-step 2.a uses the fast code transform 25 developed in references [3], [4] to generate the encoded vector. Sub-step 2.b uses the inverse $FFT^{-1}$ to construct the transmitter complex baseband signal $z(i_0|n_0+qN_0)$ for chip $n_0$ for data block q and these signals are combined in sub-step 2.c to generate the transmitter signal $z(i)$ for all $n_0, q$.

Step 3 evaluates the real multiply complexity metric $R_M T$ and real add computational complexity metrics $R_A T$ in terms of multiplies/adds per digital sample for the fast algorithm in step 3. The first term in these metrics is the complexity of the $FFT^{-1}$ MS-CDMA OFDMA transmitter equations (12)

1 Parameters and definitions are defined in 1 in equations (2), (9), (11) together with MS-CDMA group index field $\{g\}$ $g = 0, 1, \ldots, (M/N_1 - 1)$ where $M/N_1 =$ number of MS-CDMA groups over the M data channels Frequency harmonic k $k = k(n_1|g, q)$ MS-CDMA chip index fields $n = n_0 + n_1 N_0$ $= 0, 1, 2, \ldots, N_c - 1$ $n_0 = 0, 1, 2, \ldots, N_0 - 1$ scale 0 chips in channel $n_1 = 0, 1, 2, \ldots, N_1 - 1$ scale 1 chips in channels $N_c = N_0 N_1$ number of chips in a MS-CDMA group MS-CDMA channel code index $n_1$ $n_1 = n_1(k|g, q)$ function of $k$ for a given $g, q$ User symbol x $x = x(u | g, q)$ $= A(u | g, q) \exp j\varphi(u | g, q)$ MS-CDMS code orthogonality $CC^* = N_c I$ PN spreading code P(n) for chip n in group g $P(n|g, q) = \exp(j\phi(n|g, q))$ Assume the band and pulse filtering can be neglected on both Tx and Rx which is equivalent to the assumption $p(i) \equiv 1$ for all i 2 MS-CDMA OFDMA encoding for complex baseband signal z(i)
2.a) FCT MS-CDMA encoding for data block q $$Z(n\mid g, q) = FCT[x(u\mid g, q)]$$
$$= N_c^{-1}\Sigma_u x(u\mid g, q)C(u, n)P(n\mid g, q)$$

where FCT is the fast code transform 2.b) $FFT^{-1}$ OFDMA encoding for chip n of data block q $$z(i_0 \mid n_0 + qN_0) = FFT^{-1}[Z(n\mid g, q)]$$
$$= N^{-1}\Sigma_k Z(n\mid g, q)E*(k, i_0)$$

where $n=n_0+n_1 N_0$
$n_1=n_1(k\mid g,q)$ $Z(n\mid g,q)=Z(n_0+n_1(k\mid g,q)N_0)$ 2.c) Complex baseband transmitter signal z(i)

$z(i)=\Sigma_{(o)}z(i_0 n_0+qN_0)$ for $(o)=(n_0+qN_0)N$

3 Computational complexity
Real multiply rate $R_M$ $R_M T=2\log_2(N)$

Real add rate $R_a$ $R_A T=3\log_2(N)+2\log_2(N_c)+2$ for a base 2 and the second term is the complexity of the FCT assuming the FCT does not require any multiplies.

MS-CDMA OWDMA transmitter equations are defined in equations (13) for MS-CDMA. Step 1 lists the parameters and definitions. Step 2 defines the encoding equations for chip no for data block q. The FCT on the symbols in sub-step 2.a yields the encoded data block Z(n|g,q) and the FWT on this output in sub-step 2.b yields the transmitter complex baseband signal $z(i_0 n_0+qN_0)$ for chip no for data block q and these signals are combined in sub-step 2.c to generate the transmitter signal z(i) for all $n_0,q$.

MS-CDMA OWDMA transmitter equations    (13)

1 Parameters and definitions are defined in 1 in equations (9), (12) together with the range of q $q = 0$ for the data block being addressed $= +/- 1$ contiguous data blocks Assume the h(f) is flat over the passband for both Tx and Rx and can be neglected 2 MS-CDMA OWDMA encoding for chip no for data block q
2.a) FCT MS-CDMA encoding for data block q $$Z(n\mid g, q) = FCT[x(u\mid g, q)]$$
$$= N_c^{-1}\Sigma_u x(u\mid g, q)C(u, n)P(n\mid g)$$

2.b) FWT OWDMA encoding for chip $n_0$ of data block q $$z(i_0 \mid n_0 + qN_0) = \Sigma_{\delta q}\Sigma_\Delta FWT[Z(n+\Delta \mid g, q+\delta q)]$$
$$= N^{-1}\Sigma_k \Sigma_{\delta q}\Sigma_\Delta Z(n+\Delta\mid g, q+\delta q)\psi(i\mid n_0+\Delta, k)$$
$$= N^{-1}\Sigma_k \Sigma_{\delta q}\Sigma_\Delta Z(n+\Delta\mid g, q+\delta q)\psi(i_0+\Delta N)E*$$
$$(k, i_0)$$

where the overlap conditions on δq are $\delta q = \Delta$ for $N_0 = 1$ $= \text{sign}(\Delta + n_0)\lfloor|\Delta + n_0|/N_0\rfloor$ otherwise sign(o)=numerical sign of (o)
$\lfloor(o)\rfloor$=rounded down integer value of (o)
where the overlap index $\Delta=0, +/-1, \ldots, +/-(L/2-1)$ 2.c) Complex baseband transmitter signal z(i)

$z(i)=\Sigma_{(o)}z(i_0|n_0+qN_0)$ for $(o)=(n_0+qN_0)N$

3 FWT algorithm for OWDMA encoding in the transmitter
3.a) FWT pre-calculation $FFT^{-1}$ $$\lambda(i_0\mid n_0+\Delta, q) = N^{-1}\Sigma_k Z(n+\Delta\mid g, q)E^*(k, i_0)]$$
$$= FFT^{-1}[N^{-1}\Sigma_k Z(n+\Delta\mid g, q)E*(k, i_0)]]$$

3.b) FWT post-sum $z(i_0|n_0)=\Sigma_q \Sigma_\Delta \psi(i-(n_0+\Delta)N)\lambda(i_0|n_0+\Delta,q)$ 4 Computational complexity for fast algorithms in 2.a,3
Real multiply rate $R_M$ $R_M T=2\log_2(N)+2L$ Real add rate $R_a$ $R_A T=3\log_2(N)+2L+2\log_2(N_c)+2$ Step 3 is the new fast FWT algorithm in this invention disclosure for the transmitted OWDMA which consists of the pre-calculation $FFT^{-1}$ in sub-step 3.a followed a post-sum in sub-step 3.b of the product from sub-step 3.a with the corresponding Wavelet overlaps over the q data block interval.

Step 4 evaluates the real multiply complexity metric $R_M T$ and real add computational complexity metrics $R_A T$ in terms of multiplies/adds per digital sample for the fast algorithms FCT and FWT in steps 2,3. The first term in these metrics is the complexity of the $FFT^{-1}$ for a base 2, the second term 2L is the complexity of extending the multi-resolution complex Wavelet waveform over L of the MT symbol intervals, and the remaining terms are the complexity of the FCT assuming the FCT does not require any multiplies.

MS-CDMA OFDMA/OWDMA encoding for the transmitter in FIG. 6 is a representative implementation of the MS-CDMA OFDMA encoding algorithms in equations (12) and the MS-CDMA OWDMA encoding algorithms in equations (13). Signal processing starts with the input stream of data encoded symbols x(u|g,q) 40 from the transmitter symbol encoder 52 in FIG. 7A and defined in 1 in equations (12) for both OFDMA and OWDMA.

FIG. 6 MS-CDMA encoding 41 implements the fast code transform FCT encoding defined in sub-step 2.a in equations (12), (13) for the MS-CDMA encoding and PN cover or spreading encoding to generate the $N_c$ outputs x(u|g,q)C(u, n)P(n|g) for each MS-CDMA group g and data block q. For each group these outputs are summed 42 over u to generate the encoded vector Z(n|g,q) in 43.

OFDMA processing 44 performs an $FFT^{-1}$ on the received set of vectors Z(n|g,q) and a summation to implement sub-steps 2.b,2.c in equations (12) and the output is band filtered 46 to generate the MS-CDMA OWDMA encoded complex baseband signal z(i) in 47.

OWDMA processing 45 performs an FWT on the received set of vectors Z(n|g,q) and a summation to implement sub-steps 2.b,2.c in equations (13) and the output is band filtered 46 to generate the MS-CDMA OWDMA encoded complex baseband signal z(i) in 47.

Outputs $z(i_0|n_0)$ 47 from the MS-CDMA OFDMA and MS-CDMA OWDMA are digital-to-analog DAC converted 48 and handed off to the analog front end 49 as the complex baseband analog signal z(t) in 49.

MS-CDMA OFDMA/OWDMA transmitter description in FIG. 7 presents a block diagram in FIG. 7A and a representative MS-CDMA mapping in FIG. 7B. FIG. 7A is a representative transmitter implementation of the MS-CDMA OFDMA and MS-CDMA OWDMA encoding in FIG. 6. The transmitter block diagram in FIG. 7A includes the FIG. 6 MS-CDMA OFDMA/OWDMA encoding in an abbreviated format 54 in FIG. 7A. FIG. 7A signal processing starts with the stream of user input data words. Frame processor 51 accepts these data words and performs the encoding and frame formatting wherein CRC is a cyclic redundant code for error detection, and passes the outputs to the symbol encoder 52 which encodes the frame symbols into amplitude (Ampl.) and phase coded symbols x(u|g,q) 53 which are the input to the MS-CDMA encoding 55 and which is 41,42 in FIG. 6.

MS-CDMA FCT encoding outputs Z(n|g,q) 56 are handed over to the OFDMA and OWDMA processing 57 which performs an inverse $FFT^{-1}$ followed by a band filtering for OFDMA which is 44,46 in FIG. 4 and performs an inverse $FWT^{-1}$ followed by a band filtering which is 45,46 in FIG. 6. This complex baseband signal z(i) in 47 in FIG. 6 is digital-to-analog DAC converted 59 and the output complex baseband analog signal z(t) 60 is handed off to the analog front end 61.

The z(t) is single sideband upconverted, amplified, and transmitted (Tx) by the analog front end 61 as the real waveform v(t) 62 at the carrier frequency $f_0$ whose amplitude is the real part of the complex envelope of the baseband waveform z(t) and the phase angle $\phi$ accounts for the phase change from the baseband signal to the transmitted signal. Output waveform 62 from the analog front end is the Tx waveform from the Tx antenna.

FIG. 7B illustrates a representative MS-CDMA uniform mapping of each data symbol over frequency, time, antennas, and beams of a cellular communications transmitter. Multiple antennas and beams are used when a multiple-input-multiple-output MIMO communications link is being implemented. The algebraic field construction of the algebraic index fields for the codes and chips for a 2-scale MS-CDMA construction of a non-factorable code matrix C in equations (11) represented by 151 and 152 in FIG. 7B for the algebraic chip indices $n_0$, $n_1$ is continued in FIG. 7B to include the algebraic chip index fields for chips $n_2$ in 153 over the frequency bands, chips $n_3$ in 154 over the data blocks, chips $n_4$ in 155 over the transmit antenna beams, and chips $n_5$ in 156 over the transmit antennas. The corresponding algebraic code indices are respectively $u_0$, $u_1$, $u_2$, $u_3$, $u_4$, $u_5$ and the MS-CDMA code length is $N_c=N_0N_1N_2N_3N_4N_5$ chips.

It should be obvious to anyone skilled in the communications art that this example implementation in FIGS. 6,7 clearly defines the fundamental MS-CDMA OFDMA and MS-CDMA OWDMA signal processing relevant to this invention disclosure and it is obvious that this example is representative of the other possible signal processing approaches.

MS-CDMA OFDMA receiver equations are defined in equations (14). Step 1 lists the parameters and definitions and the assumption that the band and pulse filtering can be neglected. Step 2 defines decoding of the received chip signal to derive the estimate $\hat{x}(u|g,q)$ of the transmitted symbol x(u|g,q). Sub-step 2.a derives the estimate for the encoded symbols using the FFT and sub-step 2.b uses the $FCT^{-1}$ on this estimate to derive the transmitted symbol estimate.

MS-CDMA OFDMA receiver equations (14)

1 Parameters and definitions are defined in 1 in equations (2), (9), (11) together with
  $\hat{z}(i)$=receiver band filter estimate of the transmitted complex baseband signal z(i)
  Assume the band and pulse filtering can be
  neglected on both Tx and Rx which is
  equivalent to the assumption $p(i) \cong 1$ for all i
2 MS-CDMA OFDMA decoding to derive data symbol $\hat{x}$ (u|g,q)
  2.a) FFT of each received chip vector $\hat{z}$ ($i_0n_0+qN_0$)

$$\hat{Z}(n|g,q) = \text{estimate of transmitted } Z(n|g \cdot q)$$
$$= FFT[\hat{z}(i_0|n_0+qN_0)]$$
$$= \Sigma_{i_0}\hat{z}(i_0|n_0+qN_0)E(k, i_0)$$

where $\hat{z}$ ($i_0|n_0+qN_0$)=$\hat{z}$ (i=$i_0$+($n_0$+$qN_0$)N
2.b) $FCT^{-1}$ of each group g encoded vector Z(n|g,q)

$$\hat{x}(u|g,q) = FCT^{-1}[\hat{Z}(n|g, q=0)]$$
$$= \Sigma_n \hat{Z}(n|g,q)P*(n|g)C*(u,n)$$

3 Computational complexity is the same as calculated in 3 in equations (12) for the transmitter MS-CDMA OWDMA receiver equations are defined in equations (15). Step 1 lists the parameters and definitions and the assumption that the band and pulse filtering can be neglected.

MS-CDMA OWDMA receiver equations (15)

1 Parameters and definitions are defined in 1 in equations (2), (9), (11), (14) together with
  $\hat{z}$ (i)=receiver band filter estimate of the transmitted complex baseband signal z(i)
  Assume the h(f) is flat over the passband for both Tx and Rx and can be neglected
2 MS-CDMA OWDMA decoding to derive data symbol $\hat{x}$ (u|g,q)
  2.a) $FWT^{-1}$ of each received signal $\hat{z}$ (i)

$$\hat{Z}(n|g,q) = \text{estimate of transmitted } Z(n|g \cdot q)$$
$$= FWT^{-1}[\hat{z}(i)]$$

-continued $$= \Sigma_i \hat{z}(i) \psi^*(i \mid q, k)$$

$$= \Sigma_{i_0} \Sigma_\Delta \hat{z}(i_0 \mid n_0 + (q + \Delta)N) \psi(i_0 + \Delta N) E(k, i_0)$$

where $\hat{z}(i_0 \mid n_0 + qN_0) = \hat{z}(i = i_0 + (n_0 + qN_0)N)$
$k \rightarrow g$ which means $k$ specifies $g$
$n_0, k \rightarrow n = n_0 + n_1(k \mid g, q)$
2.b) $FCT^{-1}$ of each group $g$ encoded vector $Z(n \mid g, q)$ $$\hat{x}(u \mid g, q) = FCT^{-1} [\hat{Z}(n \mid g, q)]$$

$$= \Sigma_n \hat{Z}(n \mid g, q) P*(n \mid g) C*(u, n)$$

3 $FWT^{-1}$ algorithm
   2.a) $FWT^{-1}$ pre-sum $$k(i_0 \mid g, q) = \Sigma_\Delta \hat{z}(i_0 \mid n_0 + (q + \Delta)N) \psi(i - (n_0 + \Delta)N)$$

where $n_0 + \Delta \rightarrow g$ using the boundary conditions in 2.b in equations (13)
   2.b) $FWT^{-1}$ pre-sum FFT $$\hat{Z}(n \mid g, q) = \Sigma_{i_0} FFT[\lambda(i_0 \mid g, q)]$$

$$= \Sigma_{i_0} \lambda(i_0 \mid g, p) E(k, i_0)$$

3 Computational complexity is the same as calculated in 3 in equations (13) for the transmitter Step 2 defines decoding of the received chip signal to derive the estimate $\hat{x}(u \mid g, q)$ of the transmitted symbol $x(u \mid g, q)$. Sub-step 2.a derives the estimate for the encoded symbols using the $FWT^{-1}$ and sub-step 2.b uses the $FCT^{-1}$ on this estimate to derive the transmitted symbol estimate. Step 3 is the new fast FWT algorithm in this invention disclosure for the received MS-CDMA OWDMA which consists of the pre-sum in sub-step 3.a followed an FFT on this pre-sum.

MS-CDMA OFDMA/OWDMA decoding for the receiver in FIG. 8 is a representative implementation of the MS-CDMA OFDMA decoding algorithms in equations (14) and the MS-CDMA OWDMA decoding algorithms in equations (15). Signal processing starts with the input intermediate frequency IF signal after being single sideband downconverted and synchronized in frequency 63 from the receiver front end 72 in FIG. 9. This input signal is band filtered 64 and handed off to the analog-to-digital converter ADC or A/D 65 whose digital output is the received estimate $z(i)$ 66 of the transmitted complex baseband signal $z(i)$ 60 in FIG. 7. For OFDMA 67 this received signal is processed by an FFT to derive estimates $\hat{Z}(n \mid g, q)$ 68 of the MS-CDMA encoded signal $Z(n \mid g, q)$ 56 in FIG. 7. For OWDMA 67 this received signal is processed by an inverse multi-resolution complex Wavelet transform $FWT^{-1}$ to derive estimates $\hat{Z}(n \mid g, q)$ 68 of the MS-CDMA encoded signal $Z(n \mid g, q)$ 56 in FIG. 7 implementing the fast algorithm defined in 2 in equations (15). Recovered estimates $\hat{Z}(n \mid g, q)$ 68 are processed by the inverse fast code transform $FCT^{-1}$ 69 to derive estimates $\hat{x}(u \mid g, q)$ 70 of the transmitted data symbols $x(u \mid g, q)$ 53 in FIG. 7 for hand over to the symbol decoder.

MS-CDMA OFDMA/OWDMA receiver block diagram in FIG. 9 is a representative receiver implementation of the MS-CDMA OFDMA and MS-CDMA OWDMA decoding in FIG. 8. The receiver block diagram in FIG. 9 includes the FIG. 8 MS-CDMA OFDMA/OWDMA decoding in an abbreviated format 74 in FIG. 9. FIG. 9 signal processing starts with the received Rx waveform 71 from the transmitter 62 in FIG. 7. Received (Rx) signal $\hat{v}(t)$ 71 is an estimate of the transmitted signal $v(t)$ 62 in FIG. 7 received with errors in time $\Delta t$, frequency $\Delta f$, phase $\Delta \theta$, and with an estimate $\hat{z}(i)$ of the transmitted complex baseband signal $z(t)$ 60 in FIG. 7. This received signal $\hat{v}(t)$ is amplified and downconverted by the analog front end 72 and single side band SSB downconverted and synchronized 73 and handed over to the digital-to-analog conversion DAC processing 75 for band filtering by $h(f)$ and digitization to generate the baseband signal $\hat{z}(i)$ 76 which is the received estimate of the transmitted signal $z(i)$ 60 in FIG. 7. Timing synchronization could be implemented in the DAC.

Outputs $\hat{z}(i)$ are processed by the MS-CDMA OFDMA/OWDMA decoding to derive estimates $\hat{x}(u \mid g, q)$ 79 of the transmitted symbols $x(u \mid g, q)$ 53 in FIG. 7 and part of the information is handed off to the synchronization (sync) processor. For the inverse MS-CDMA$^{-1}$ OFDMA$^{-1}$ the processing 79 consists of the FFT to recover estimates $\hat{Z}(n \mid g, q)$ of $Z(n \mid g, q)$ followed by an inverse $FCT^{-1}$ to recover $\hat{x}(u \mid g, q)$. For the inverse MS-CDMA$^{-1}$ OWDMA$^{-1}$ the processing 79 consists of the inverse $FWT^{-1}$ to recover estimates $\hat{Z}(n \mid g, q)$ of $Z(n \mid g, q)$ followed by an inverse $FCT^{-1}$ to recover $\hat{x}(u \mid g, q)$ and the fast transform in 2 in equations (15). Outputs $\hat{x}(u \mid g, q)$ are processed by the symbol decoder 80 and the frame processor 81 for handoff as the received Rx data 82.

It should be obvious to anyone skilled in the communications art that this example implementation in FIGS. 8,9 clearly defines the fundamental MS-CDMA OFDMA and MS-CDMA OWDMA signal processing relevant to this invention disclosure and it is obvious that this example is representative of the other possible signal processing approaches.

Variable power control across the frequency band can be implemented by assigning each group g of transmit Tx signals their own power level P(g). Each MS-CDMA group g occupies a subset of the channels over the frequency band B consisting of $N_1$ channels which means that the users within group g are transmitted with the same Tx power. On receive each group g of channels is processed separately so there is no cross-talk between the users in the different groups. The OWDMA was designed to support large dynamic range imbalances between channels which could be present with power level control. MS-CDMA OFDMA/OWDMA variable power control over the frequency subbands corresponding to the MS-CDMA groups supports the potential for diversity improvements by allocation of the available power to emphasize the 'best' set of available subbands, which subbands are not required to be contiguous as well as supporting the simultaneous support of multiple users with differing power requirements due to range, multi-path, and path attenuation effects.

A second configuration for variable power control is described in reference [2] and increases the flexibility of power control to all of the individual channels.

Preferred embodiments in the previous description is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is not to be accorded the wider scope consistent with the principles and novel features disclosed herein.

What is claimed is:

1. A method for implementation of multi-resolution complex Wavelet waveforms in the Fourier domain and orthogonal Wavelet division multiple access (OWDMA) filter banks, said method comprising:

deriving a single multi-resolution Wavelet implementation using design coordinates in the frequency domain to provide multi-resolution property for Wavelets at multiple scales and translations;

changing said Wavelet to a complex Wavelet in the Fourier frequency domain by incorporating a frequency translation as a Wavelet parameter in addition to existing scale (dilation) and translation (shift) parameters;

deriving said complex Wavelet with flexibility to meet filter design requirements;

constructing OWDMA filters and filter banks implemented with said complex Wavelet waveforms over frequency bands for simultaneous implementation of multi-resolution OWDMA filters at different scales and different frequencies and different symbol rates;

using said complex Wavelet to generate a multi-resolution mother Wavelet at dc using design coordinates in the frequency domain which enable the generation of a desired multi-resolution complex Wavelet using appropriate scale, frequency, and translation changes to the mother Wavelet; and implementing said OWDMA filters in a communications transmitter and in a communications receiver for a communications link.

2. A method for implementation of multi-scale complex code division multiple access (MS-CDMA) encoding and decoding over multiple scales where each scale corresponds to an independent communications parameter, said method comprising:

generating independent subbands or groups of subbands over a frequency band;

generating a 2 scale MS-CDMA code and assigning the subbands over a frequency band into MS-CDMA groups, MS-CDMA encoding and spreading each user in each group such that each user is spread within each subband in the MS-CDMA group in a scale "0" encoding and spreading, each user in each group is spread over the subbands of the MS-CDMA group in a scale "1" encoding and spreading;

constructing a complex orthogonal 2-scale MS-CDMA code matrix as a Kronecker product (tensor product) of a subband complex orthogonal MS-CDMA code matrix for scale "0" encoding and spreading and a wideband complex orthogonal MS-CDMA code matrix for scale "1" encoding and spreading;

constructing a complex orthogonal N-scale MS-CDMA code matrix as a Kronecker product of orthogonal complex MS-CDMA code matrixes for each of the MS-CDMA scales "0", "1", . . . , "N−1", with each scale assigned to an independent communications parameter, with each scale performing encoding and spreading of the users;

constructing an algebraic field factorization and scaling to convert a CDMA code matrix to a 2-scale CDMA code matrix by generating a CDMA code with a code length equal to a product of a number of chips for a first scale "0" CDMA encoding having first code and chip indices used to encode data symbols within each subband, and a number of chips for a second scale "1" CDMA encoding having second code and chip indices used to encode data symbols over the entire set of subbands, forming a 2-scale CDMA code by assigning code and chip indices such that the 2-scale CDMA code and chip indices are the algebraic addition of the first scale "0" code and chip indices plus scaled second scale "1" code and chip indices, wherein said scaled indices are generated using a scale factor that comprises the number of indices in the first scale CDMA code, wherein the steps of generating and forming further include encoding data symbols with the 2-scale CDMA code to generate encoded chips, assigning each of the encoded chips to a subband in accordance with the second scale "1" CDMA code indices, assigning each encoded chip to a chip position within its assigned subband in accordance with the first scale "0" CDMA code indices, and generalizing to scales "0", "1", . . . , "N−1" for an N-scale MS-CDMA code matrix with each scale assigned to an independent communications parameter, with each scale performing encoding and spreading of the users;

encoding and decoding said N-scale MS-CDMA with fast algorithms;

controlling the power level the transmitted signal as a function of the frequency over the frequency band; and implementing said N-scale MS-CDMA in a communications transmitter and in a communications receiver for a communications link.

3. A method for implementing MS-CDMA orthogonal frequency division multiple access (OFDMA) communications and for implementing MS-CDMA orthogonal Wavelet division multiple access (OWDMA) communications, said method comprising:

assigning OFDMA or OWDMA users to channel groups and MS-CDMA encoding and spreading each set of users in these groups with a 2 scale MS-CDMA code such that each user in a group is spread over all of the channels in a group in a scale "1" encoding and spreading, and is spread within each channel of a group in a scale "0" encoding and spreading;

constructing a MS-CDMA code matrix with a Kronecker product for encoding and spreading at each of the scales, with each scale assigned to an independent communications parameter, with each scale performing encoding and spreading of the users, and with one or more scales assigned to OFDMA or OWDMA;

constructing a complex orthogonal multi-scale MS-CDMA code matrix for encoding and spreading at each of the scales with a scaled algebraic field, with each scale assigned to an independent communications parameter, with each scale performing encoding and spreading of the users, and with one or more scales assigned to OFDMA or OWDMA;

encoding and decoding MS-CDMA OWDMA, and MS-CDMA OFDMA with fast algorithms; and implementing said MS-CDMA OFDMA and MS-CDMA OWDMA using filters in a communications transmitter and in a communications receiver for a communications link.

* * * * *